(12) United States Patent
Park et al.

(10) Patent No.: US 11,170,090 B2
(45) Date of Patent: Nov. 9, 2021

(54) DISPLAY DEVICE INCLUDING FINGERPRINT SENSOR AND FINGERPRINT AUTHENTICATION METHOD THEREOF

(71) Applicant: Samsung Display Co., LTD., Yongin-si (KR)

(72) Inventors: Won Sang Park, Yongin-si (KR); Jin Oh Kwag, Yongin-si (KR); Il Nam Kim, Yongin-si (KR); Ji Hun Ryu, Yongin-si (KR); Seung Hyun Moon, Yongin-si (KR); Bong Hyun You, Yongin-si (KR); Jong Hyun Lee, Yongin-si (KR); Hee Chul Hwang, Yongin-si (KR)

(73) Assignee: Samsung Display Co., LTD., Yongin-si (KR)

( * ) Notice: Subject to any disclaimer, the term of this patent is extended or adjusted under 35 U.S.C. 154(b) by 0 days.

(21) Appl. No.: 16/997,871

(22) Filed: Aug. 19, 2020

(65) Prior Publication Data
US 2021/0055826 A1    Feb. 25, 2021

(30) Foreign Application Priority Data
Aug. 21, 2019   (KR) .................. 10-2019-0102536

(51) Int. Cl.
*G06F 21/32* (2013.01)
*G06F 3/042* (2006.01)
*G06K 9/00* (2006.01)

(52) U.S. Cl.
CPC ............ *G06F 21/32* (2013.01); *G06F 3/0421* (2013.01); *G06F 3/0425* (2013.01);
(Continued)

(58) Field of Classification Search
CPC ...... G06F 21/32; G06F 3/0421; G06F 3/0425; G06F 3/0412; G06K 9/00114;
(Continued)

(56) References Cited

U.S. PATENT DOCUMENTS

| 6,292,576 B1 | 9/2001 | Brownlee |
| 10,262,186 B2 | 4/2019 | Lee et al. |

(Continued)

FOREIGN PATENT DOCUMENTS

| EP | 3 267 359 | 1/2018 |
| KR | 10-0816553 | 3/2008 |

(Continued)

*Primary Examiner* — Jonathan A Boyd
(74) *Attorney, Agent, or Firm* — H.C. Park & Associates, PLC

(57) ABSTRACT

A display device includes a fingerprint sensor including a first layer having at least one photo sensor to generate a fingerprint image corresponding to reflected light from a fingerprint contact surface, light emitting elements to transmit light reflected by the fingerprint, and a second layer including pin holes to allow reflected light to be incident upon the at least one photo sensor; and fingerprint detector to receive the fingerprint image from the fingerprint sensor, to extract a first image corresponding to a first region of the fingerprint and a second image corresponding to a second region of the fingerprint, to compare the first and second images to determine similarity, and to perform fingerprint authentication, based on similarity determination, where the fingerprint first region is in contact with the fingerprint contact surface and the fingerprint second region is not in contact with the fingerprint contact surface.

25 Claims, 19 Drawing Sheets

(52) U.S. Cl.
CPC ..... *G06K 9/00013* (2013.01); *G06K 9/00087* (2013.01); *G06K 9/00114* (2013.01)

(58) Field of Classification Search
CPC ........... G06K 9/00013; G06K 9/00087; G06K 9/0004; G06K 9/00067; H04L 63/0861
See application file for complete search history.

(56) References Cited

U.S. PATENT DOCUMENTS

| | | | |
|---|---|---|---|
| 10,366,271 B2 | 7/2019 | Ahn et al. | |
| 10,438,046 B2 | 10/2019 | He et al. | |
| 2014/0023249 A1* | 1/2014 | Higuchi | A61B 5/1172 382/127 |
| 2014/0286548 A1* | 9/2014 | Shin | G06K 9/00114 382/127 |
| 2015/0205992 A1* | 7/2015 | Rowe | G06K 9/2018 382/124 |
| 2017/0004351 A1* | 1/2017 | Kim | G06K 9/00087 |
| 2017/0004352 A1* | 1/2017 | Jonsson | G06K 9/00013 |
| 2018/0012069 A1 | 1/2018 | Chung et al. | |
| 2018/0039818 A1* | 2/2018 | Kim | G06K 9/0012 |
| 2018/0060639 A1* | 3/2018 | Lee | G06K 9/00087 |
| 2018/0268232 A1 | 9/2018 | Kim et al. | |
| 2019/0034020 A1 | 1/2019 | He et al. | |

FOREIGN PATENT DOCUMENTS

| | | |
|---|---|---|
| KR | 10-1774746 | 9/2017 |
| KR | 10-2017-0116530 | 10/2017 |
| KR | 10-1828800 | 2/2018 |
| KR | 10-1923335 | 2/2019 |

* cited by examiner

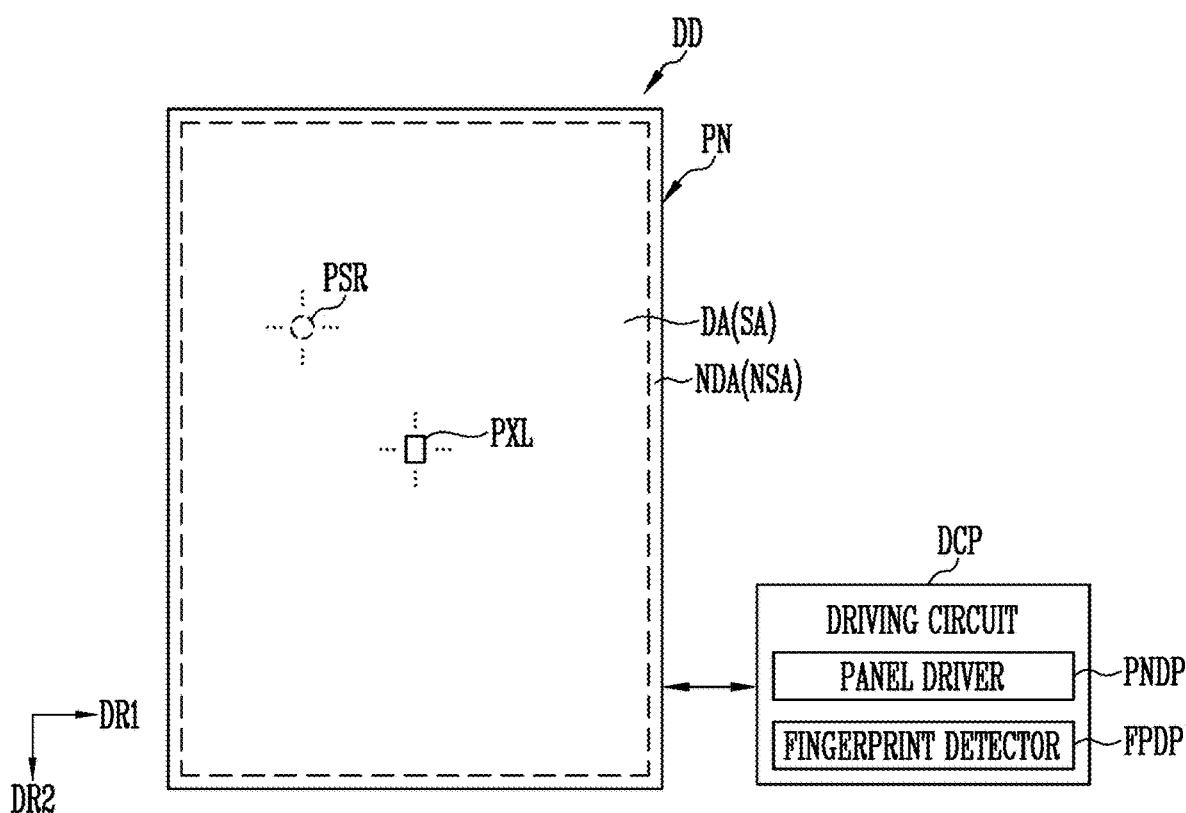

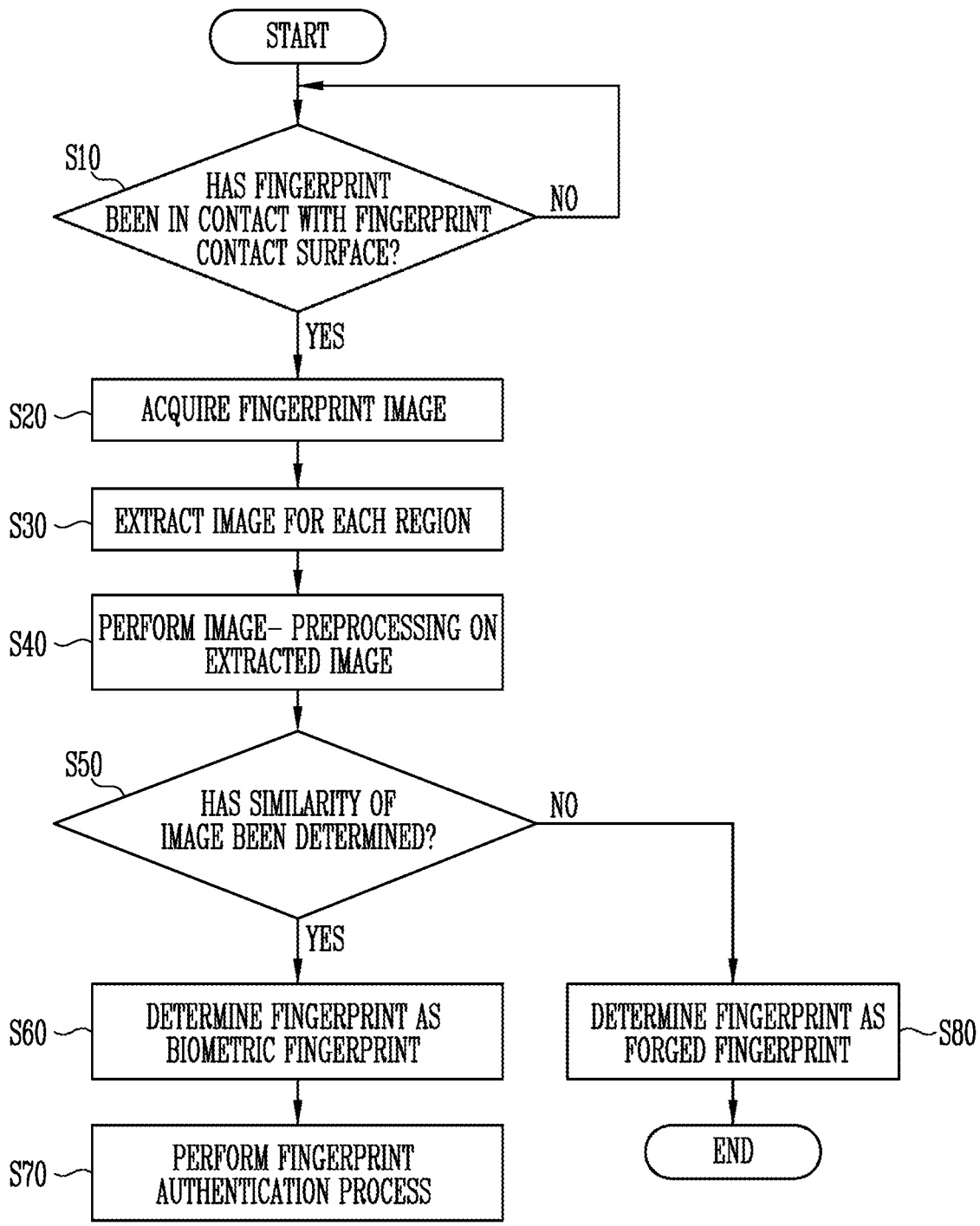

DISPLAY DEVICE INCLUDING FINGERPRINT SENSOR AND FINGERPRINT AUTHENTICATION METHOD THEREOF

CROSS REFERENCE TO RELATED APPLICATION

This application claims priority from and the benefit of Korean Patent Application No. 10-2019-0102536, filed on Aug. 21, 2019, which is hereby incorporated by reference for all purposes as if fully set forth herein.

BACKGROUND

Field

Exemplary implementations of the invention relate generally to display device and, more particularly, to a display device including a fingerprint sensor and a fingerprint authentication method thereof.

Discussion of the Background

Electronic devices including portable or mobile computing devices, such as laptops, tablets, smartphones, and gaming systems may employ user authentication mechanisms to protect personal data and prevent unauthorized access. User authentication on an electronic device may be performed through one or multiple forms of biometric identifiers, which may be used alone or together with the existing password authentication methods. A popular form of biometric identifiers is a fingerprint pattern of a person. A fingerprint sensor may be built into the electronic device to read a fingerprint pattern of a user, so that the electronic device can be unlocked by only an authorized user of the electronic device through authentication of the fingerprint pattern of the user.

The above information disclosed in this Background section is only for understanding of the background of the inventive concepts, and, therefore, it may contain information that does not constitute prior art.

SUMMARY

Display devices constructed according to the principles and exemplary implementations of the invention include a fingerprint sensor capable of easily identifying a forged (modified, imitated or the like) fingerprint by simultaneously acquiring an image of a fingerprint in contact with a fingerprint contact surface for the purpose of use authentication and a peripheral image of the fingerprint and determining the similarity between the image of the fingerprint and the peripheral image of the fingerprint.

Fingerprint authentication methods according to the principles and exemplary implementations of the invention may be carried out by the fingerprint sensor of a display device.

Display devices constructed according to the principles and exemplary embodiments of the invention can easily determine at least one of whether a fingerprint is a forged fingerprint, without having a separate bio sensor for determining whether the fingerprint a biometric fingerprint and whether a fingerprint is a forged fingerprint, without having a sensor (e.g., a color sensor) for determining whether the fingerprint is a forged fingerprint by using color characteristics of light reflected from the fingerprint. Furthermore, display devices constructed according to the principles and exemplary embodiments of the invention can reduce manufacturing cost generated compared to when a separate bio sensor and/or a separate color sensor are required.

Additional features of the inventive concepts will be set forth in the description which follows, and in part will be apparent from the description, or may be learned by practice of the inventive concepts.

According to one aspect of the invention, a display device includes: a fingerprint sensor including a first layer having at least one photo sensor to generate a fingerprint image corresponding to reflected light from a fingerprint contact surface, light emitting elements to transmit light reflected by a fingerprint, and a second layer including pin holes to allow reflected light to be incident upon the at least one photo sensor; and a fingerprint detector to receive the fingerprint image from the fingerprint sensor, to extract a first image corresponding to a first region of the fingerprint and a second image corresponding to a second region of the fingerprint, to compare the first and second images to determine similarity, and to perform fingerprint authentication, based on similarity determination, where the first region of the fingerprint is in contact with the fingerprint contact surface and the second region of the fingerprint is not in contact with the fingerprint contact surface.

The fingerprint detector may include: a fingerprint image extractor to receive the fingerprint image from the first layer to extract the first image and the second image, an image processor to perform preprocessing on the extracted first and second images, a comparator to determine similarity by comparing the preprocessed first image and the preprocessed second image; and an authentication unit to authenticate the fingerprint, based on the determination of the comparator.

The comparator may be configured to determine whether the fingerprint is a biometric fingerprint, by comparing a luminance of the preprocessed first image and a luminance of the preprocessed second image and whether the preprocessed first and second images have similar patterns.

The comparator may be configured to determine the similarity of patterns of the preprocessed first and second images by analyzing continuity of at least one of valleys and ridges of the preprocessed second image with at least one of valleys and ridges of the preprocessed first image.

When the luminance of the preprocessed first image and the luminance of the preprocessed second image are different from each other, and the preprocessed first and second images have the similar patterns, the comparator may be configured to determine that the fingerprint can be a biometric fingerprint.

When the luminance of the preprocessed first image and the luminance of the preprocessed second image are different, and the preprocessed first and second images do not have the similar patterns, the comparator may be configured to determine that the fingerprint may be forged.

The fingerprint image extractor may be configured to extract the first and second image by differentiating an amount of light reflected in the first region of the fingerprint and an amount of light reflected in the second region of the fingerprint.

The first layer may include a light sensing array layer and the second layer may include a selective light transmitting layer having a light blocking pattern located between pin holes, and where the pin holes may be configured to focus light emitted that is from the respective light emitting elements and then reflected from the fingerprint.

The pin holes may include an array.

The fingerprint detector may include: a fingerprint image extractor to receive the fingerprint image from the light sensing array layer to extract the first image and the second image; an image processor to preprocess the extracted first and second images, and to synthesize the first and second images; a comparator to determine whether the synthesized second image from the image processor includes the array; and an authentication unit to authenticate the fingerprint, based on the determination of the comparator.

When the second image includes the array, the comparator may be configured to determine that the fingerprint image is forged.

When the second image does not include the array, the comparator may be configured to determine that the fingerprint image may be a biometric fingerprint.

The second region may be located at the periphery of the first region.

The array may include a grid arrangement.

The comparator may include a similarity determiner configured to determine similar patterns by analyzing continuity of valleys and ridges of the preprocessed second image with valleys and ridges of the preprocessed first image.

According to another aspect of the invention, a method of authenticating a fingerprint for a display device having a fingerprint sensor, includes the steps of: receiving a fingerprint image corresponding to a fingerprint of a user, in contact with a fingerprint contact surface, by sensing light reflected by the fingerprint; extracting from the fingerprint image a first image corresponding to a first region of the fingerprint in contact with the fingerprint contact surface and a second image corresponding to a second region of the fingerprint located at a periphery of the first region of the fingerprint; comparing the extracted first and second images; and authenticating the fingerprint, based on the comparison of the extracted first and second images.

The step of image preprocessing may be performed on the extracted first and second images.

The step of the fingerprint being a biometric fingerprint may be determined by using a luminance of the preprocessed first image and a luminance of the preprocessed second image to determine that the preprocessed first and second images have similar patterns.

The first and second images may have similar patterns when the preprocessed first image and the preprocessed second image have valleys and ridges in continuity with each other.

The step of the fingerprint being a biometric fingerprint may be determined when the luminance of the first and second images are different from each other, and the first and second images have similar patterns.

The step of the fingerprint may be determined forged when the luminance of the first and second images are different from each other, and the first and second images do not have similar patterns.

The fingerprint sensor may have a first layer including at least one photo sensor to sense light reflected by the fingerprint and a second layer including pin holes arranged in an array to transmit incident light upon the photo sensor, and the method may further include the step of determining that the fingerprint is a forged fingerprint, when the second image includes the array.

The fingerprint may be determined to be a biometric fingerprint, when the preprocessed second image does not include the array.

According to a further aspect of the invention, a fingerprint detector in a display device to differentiate a biometric fingerprint from a forged fingerprint may include: a fingerprint image extractor to receive a fingerprint image from a light sensing array layer to extract a first image corresponding to a first region of the fingerprint image of a fingerprint in contact with a fingerprint contact surface, and a second image corresponding to the second region of the fingerprint image not in contact with the fingerprint contact surface; an image processor to perform preprocessing on the extracted first and second images; a comparator to compare the preprocessed first image and the preprocessed second image; and an authentication unit to authenticate the fingerprint, based on the determination of the comparator.

The second region of the fingerprint image may be located at a periphery of the fingerprint.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the inventive concepts.

FIGS. 1A and 1B are block diagrams schematically illustrating an exemplary embodiment of a display device constructed according to principles of the invention.

FIG. 13 is a flowchart illustrating an exemplary fingerprint authentication method of the fingerprint detector shown in FIG. 11 according to principles of the invention.

DETAILED DESCRIPTION

Figure 1A:
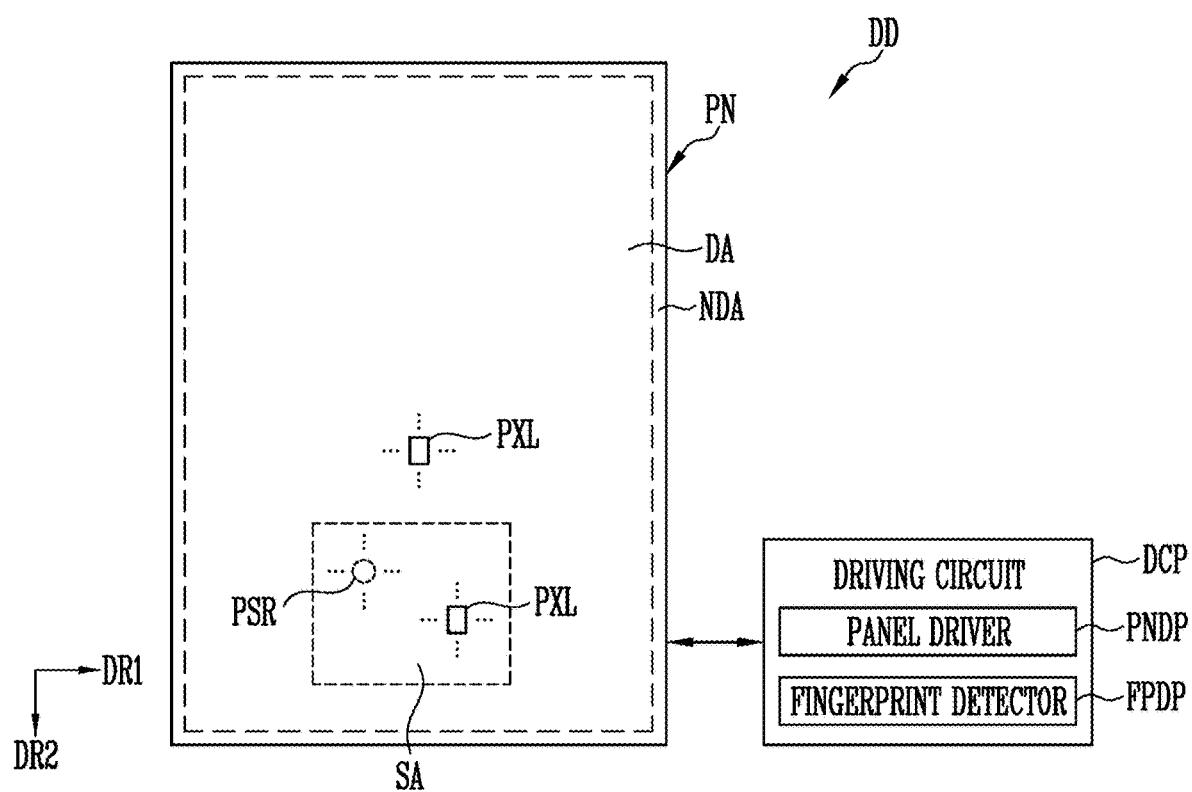

In the following description, for the purposes of explanation, numerous specific details are set forth in order to provide a thorough understanding of various exemplary embodiments or implementations of the invention. As used herein "embodiments" and "implementations" are interchangeable words that are non-limiting examples of devices or methods employing one or more of the inventive concepts disclosed herein. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments. Further, various exemplary embodiments may be different, but do not have to be exclusive. For example, specific shapes, configurations, and characteristics of an exemplary embodiment may be used or implemented in another exemplary embodiment without departing from the inventive concepts.

Unless otherwise specified, the illustrated exemplary embodiments are to be understood as providing exemplary features of varying detail of some ways in which the inventive concepts may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an exemplary embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. Further, the D1-axis, the D2-axis, and the D3-axis are not limited to three axes of a rectangular coordinate system, such as the x, y, and z-axes, and may be interpreted in a broader sense. For example, the D1-axis, the D2-axis, and the D3-axis may be perpendicular to one another, or may represent different directions that are not perpendicular to one another. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Various exemplary embodiments are described herein with reference to sectional and/or exploded illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not necessarily be construed as limited to the particular illustrated shapes of regions, but are to include deviations in shapes that result from, for instance, manufacturing. In this manner, regions illustrated in the drawings may be schematic in nature and the shapes of these regions may not reflect actual shapes of regions of a device and, as such, are not necessarily intended to be limiting.

As used herein, the term "light" means electromagnetic radiation of any wavelength that travels in a vacuum at a speed of about 300,000,000 meters per second, and particularly refers to at least one of visible, ultraviolet, and infrared light.

Figure 11:
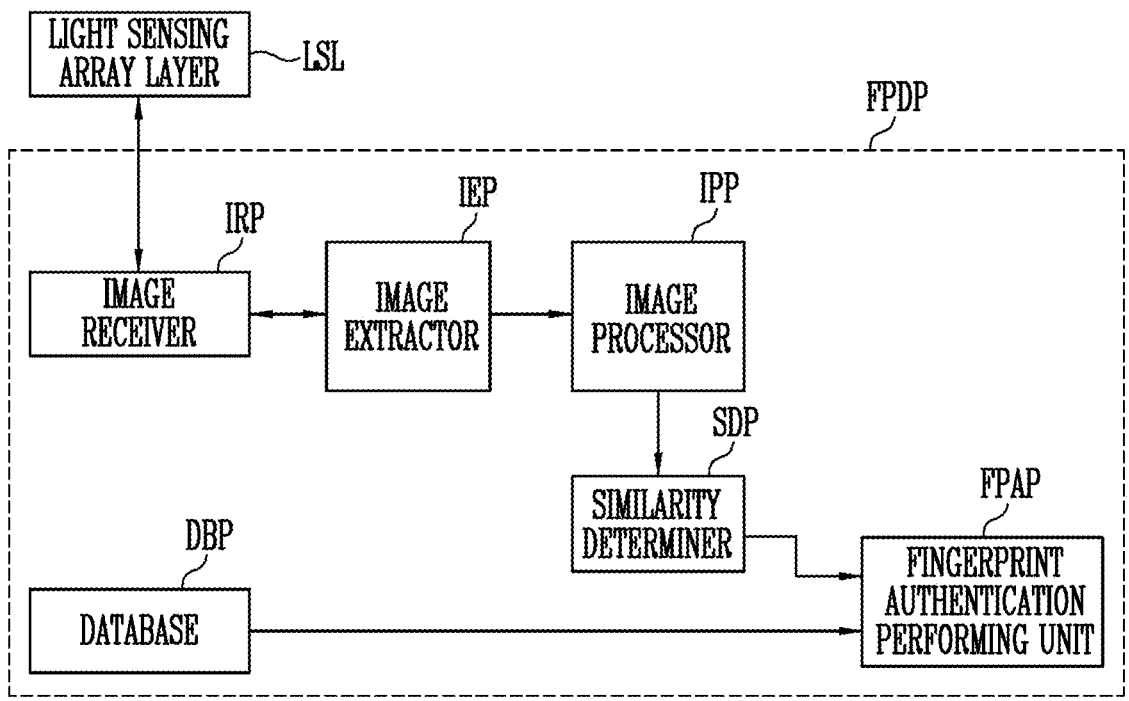
FIG. 11 is a block diagram schematically illustrating an exemplary embodiment of the fingerprint detector shown in FIGS. 1A and 1B.
Figure 14:
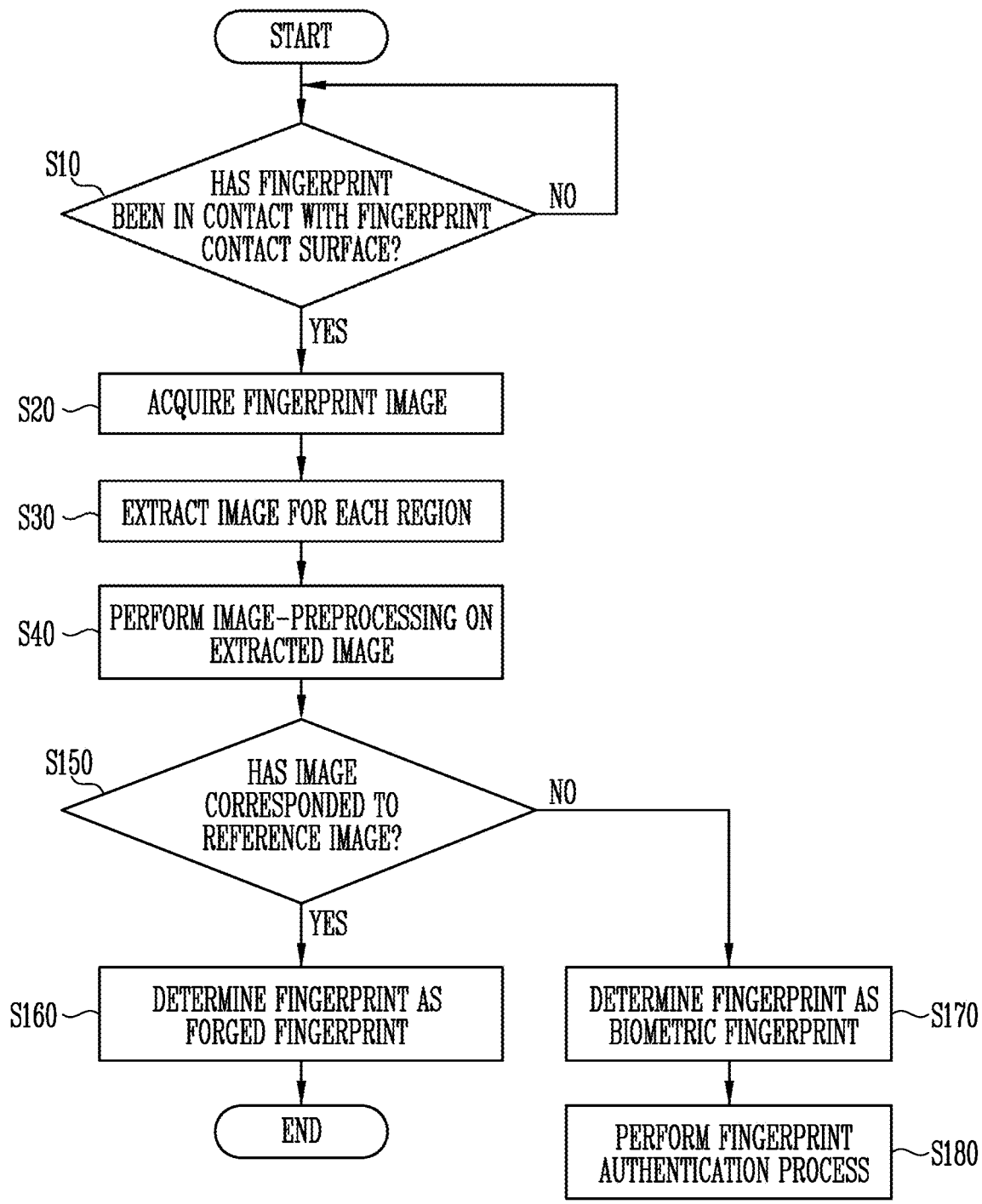
FIG. 14 is a flowchart illustrating another exemplary fingerprint authentication method of the fingerprint detector shown in FIG. 11 according to principles of the invention.

Exemplary embodiments of the devices and methods disclosed herein, including those depicted in FIGS. 11, 13 and 14, and/or one or more components thereof, may be implemented via one or more general purpose and/or special purpose components, such as one or more discrete circuits, digital signal processing chips, integrated circuits, application specific integrated circuits, microprocessors, processors, programmable arrays, field programmable arrays, instruction set processors, and/or the like.

According to one or more exemplary embodiments, the features, functions, processes, etc., described herein may be implemented via software, hardware (e.g., general processor, digital signal processing (DSP) chip, an application specific integrated circuit (ASIC), field programmable gate arrays (FPGAs), etc.), firmware, or a combination thereof. In this manner, methods of FIGS. 13 and 14, and/or one or more components thereof may include or otherwise be associated with one or more memories including code (e.g., instructions) configured to cause the methods of FIGS. 13 and 14, and/or one or more components thereof to perform one or more of the features, functions, processes, etc., described herein.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

FIGS. 1A and 1B are block diagrams schematically illustrating an exemplary embodiment of a display device constructed according to principles of the invention. More specifically, FIGS. 1A and 1B are plan views schematically illustrating a display panel provided in the display device in accordance with the exemplary embodiments of the invention and a driving circuit for driving the display panel. For convenience, although the display panel and the driving circuit are separately illustrated in FIGS. 1A and 1B, but exemplary implementations of the invention are not limited thereto. In some exemplary embodiments, the whole or a portion of the driving circuit may be integrally implemented with the display panel on the display panel.

Referring to FIGS. 1A and 1B, the display device DD in accordance with the exemplary embodiments of the invention may be provided in various shapes. For example, the display device DD may be provided in a generally rectangular plate shape having two pairs of sides substantially parallel to each other. The display device DD may display visual information e.g., a text, a video, a picture, a two-dimensional or three-dimensional image, or the like in a direction in which an image is displayed.

The whole or at least a portion of the display device DD may have flexibility. For example, the display device DD may have flexibility in the entire region or have flexibility in a region corresponding to a flexible region. When the whole of the display device DD has flexibility, the display device DD may be a rollable display device. When a portion of the display device DD has flexibility, the display device DD may be a foldable display device.

The display device may include a display panel PN and a driving circuit DCP for driving the display panel PN.

The display panel PN may include a display region DA and a non-display region NDA. The display region DA may be provided with pixels PXL, so that an image is displayed, and the non-display region NDA may be located at at least one side of the display region. For example, the non-display region NDA may be provided in a shape surrounding the display region DA.

A plurality of pixels PXL may be provided in the display region DA. In some exemplary embodiments, each of the pixels PXL may include at least one light emitting element. In some exemplary embodiments, the light emitting element may be a light emitting unit including an organic light emitting diode or subminiature inorganic light emitting diodes having a size in a micro or nano scale range, but exemplary implementations of the invention are not limited thereto. The display device DD may drive the pixels PXL, corresponding to input image data, to display an image in the display region DA.

The non-display region NDA is a region surrounding at least one side of the display region DA, and may be the other region except the display region DA. In some exemplary embodiments, the non-display region NDA may include a line region, a pad region, and/or various dummy regions.

In an exemplary embodiment of the invention, one region of the display device DD may be a sensing region SA capable of sensing a fingerprint of a user, etc. That is, at least a portion of the display region DA may be the sensing region SA. The sensing region SA may include at least some pixels PXL among the pixels PXL provided in the display region DA.

In some exemplary embodiments, only a partial region in the display region DA may be set as the sensing region SA as shown in FIG. 1A. In other embodiments, the whole of the display region DA may be set as the sensing region SA as shown in FIG. 1B. When the whole of the display region DA is set as the sensing region SA, the non-display region NDA surrounding the display region DA may set as a non-sensing region NSA. A plurality of photo sensors PSR along with a plurality of pixels PXL may be arranged in the sensing region SA.

The photo sensors PSR may be disposed at the other surface facing one surface (e.g., an image display surface) on which an image is displayed in the display device DD. That is, the photo sensors PSR may be disposed at a surface on which the image is not displayed. The photo sensors PSR may use a light emitting element provided in at least one representative pixel PXL disposed in the sensing region SA or at the periphery of the sensing region SA as a light source for fingerprint sensing, etc. To this end, the photo sensors PSR may overlap with at least some of the pixels PXL disposed in the sensing region SA, or be disposed at the periphery of the pixels PXL.

The photo sensors PSR along with the pixels PXL of the sensing region SA, particularly, light emitting elements provided in the pixels PXL may constitute a fingerprint sensor. That is, the photo sensors PSR may sense light emitted from the light emitting elements, which is then reflected by a user, and sense a fingerprint of the user by detecting the reflected light. Although a case where the photo sensors PSR are used for fingerprint sensing is described in the above-described embodiment, exemplary implementations of the invention are not limited thereto. In some embodiments, the photo sensors PSR may be used for performing various functions of a touch sensor, a scanner, and the like, in addition to the fingerprint sensing.

The display device DD in accordance with an exemplary embodiment of the invention may sense a shape or pattern of an object located on the display device DD by using the photo sensors PSR arranged in the sensing region SA included in the display region DA. As an example, the display device DD may sense a fingerprint of a user. Also, the display device DD in accordance with an exemplary embodiment of the invention may sense a fingerprint of a user by using light emitted from the pixels PXL. As described above, when a display device having a built-in fingerprint sensor is implemented by using the pixels PXL as a light source without having a separate external light source, the thickness of the display device can be decreased, and the manufacturing cost of the display device can be reduced. However, exemplary embodiments of the invention are not limited thereto, and a separate external light source for fingerprint sensing may be employed.

The driving circuit DCP may drive the display panel PN. For example, the driving circuit DCP may output a data signal corresponding to image data to the display panel PN, or output a driving signal for the photo sensors PSR and receive electrical signals (e.g., sensing signals) received from the photo sensors PSR. The driving circuit DCP may detect a fingerprint shape of a user by using the electrical signals.

In some exemplary embodiments, the driving circuit DCP may include a panel driver PNDP and a fingerprint detector FPDP. For convenience, a case where the panel driver PNDP and the fingerprint detector FPDP are separated from each other is illustrated in FIGS. 1A and 1B, but exemplary implementations of the invention are not limited thereto. For example, at least a portion of the fingerprint detector FPDP may be integrated with the panel driver PNDP, or operate in linkage with the panel driver PNDP.

The panel driver PNDP may supply a data signal corresponding to image data to the pixels PXL by sequentially scanning the pixels PXL of the display region DA. Therefore, the display panel PN may display an image corresponding to the image data.

In some exemplary embodiments, the panel driver PNDP may supply a driving signal for fingerprint sensing to the pixels PXL. The driving signal may be provided to allow the pixels PXL to operate as a light source for the photo sensors PSR by emitting light. The driving signal for fingerprint sensing may be transferred to pixels PXL provided in a specific region in the display panel PN, e.g., pixels PXL provided in the sensing region SA. In various exemplary embodiments, the driving signal for fingerprint sensing may be transferred to the pixels PXL of the sensing region SA by the fingerprint detector FPDP.

The fingerprint detector FPDP may transfer, to the photo sensors PSR, a driving signal (e.g., a driving voltage) for driving the photo sensors PSR, and detect a fingerprint of a user, based on electrical signals received from the photo sensors PSR.

Figure 2:
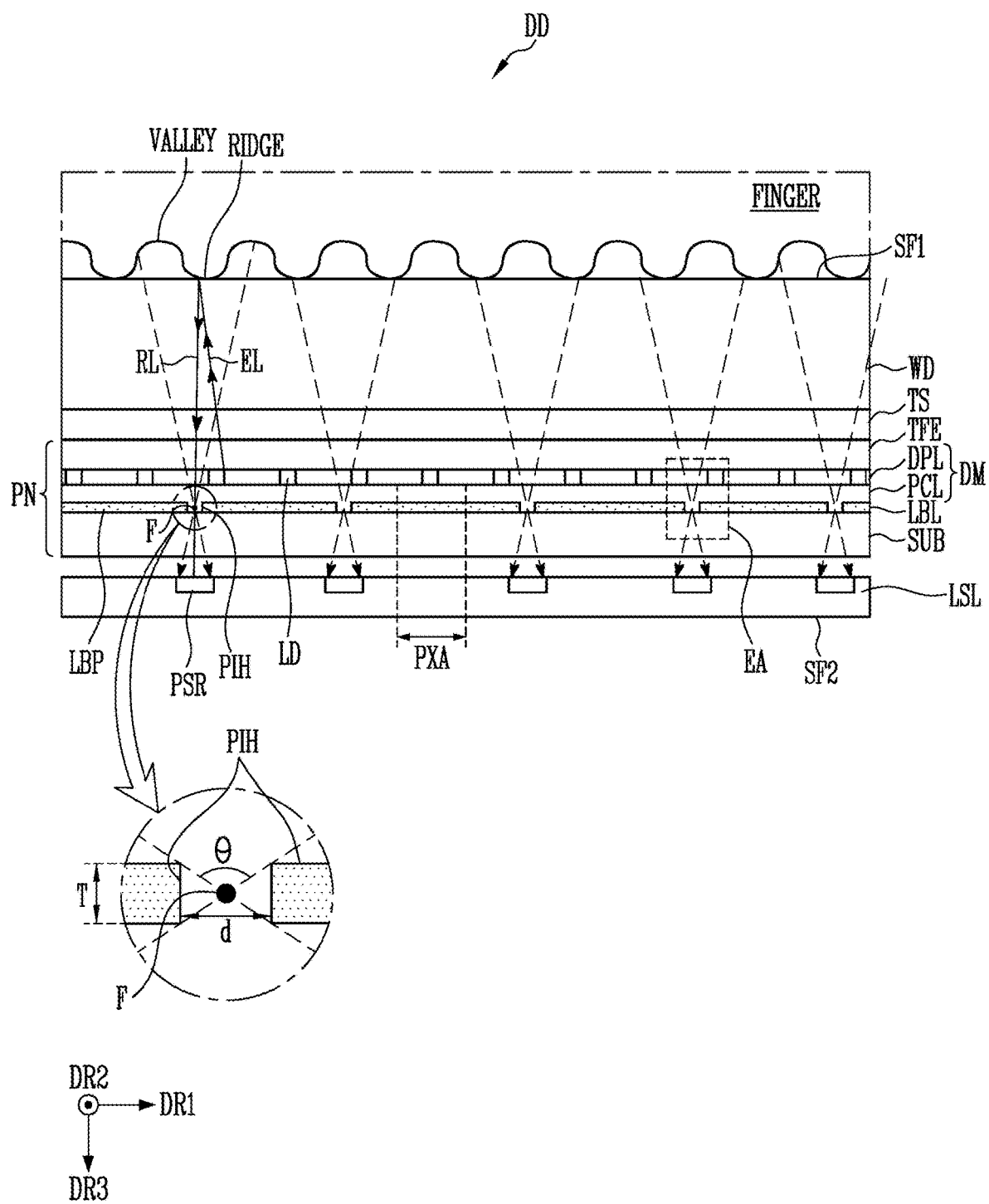
FIG. 2 is a cross-sectional view schematically illustrating the display device shown in FIGS. 1A and 1B.
Figure 3:
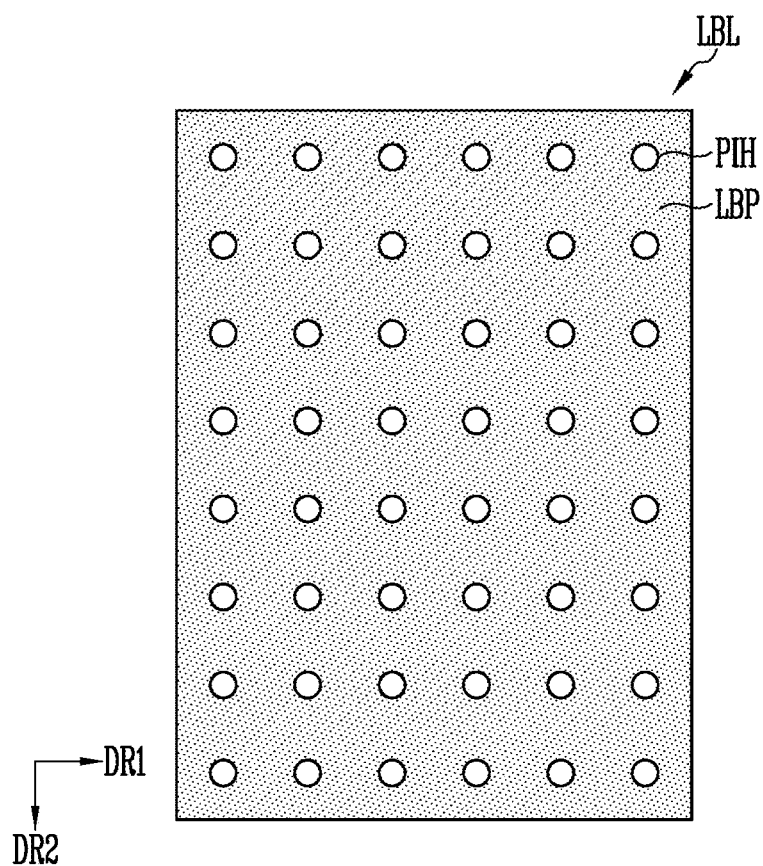
FIG. 3 is a plan view schematically illustrating an exemplary embodiment of the selective light transmitting layer shown in FIG. 2.

FIG. 2 is a cross-sectional view schematically illustrating the display device shown in FIGS. 1A and 1B. FIG. 3 is a plan view schematically illustrating an exemplary embodiment of the selective light transmitting layer shown in FIG. 2.

Referring to FIGS. 1A, 1B, 2, and 3, the display device DD in accordance with the illustrated exemplary embodiment may include the display panel PN, a touch sensor TS, and a window WD. Also, the display device DD may further include a light sensing array layer LSL disposed on any one surface of the display panel PN.

The display device DD may include a first surface SF1 on which an image is displayed and a second surface SF2 facing the first surface SF1, and the light sensing array layer LSL may be located more adjacent to the second surface SF2 than the first surface SF1. In an exemplary embodiment, the first surface SF1 of the display device DD may be a display surface on which the image is displayed. One region of the first surface SF1 of the display device DD may be a fingerprint contact surface in contact with a fingerprint of a user.

The display panel PN may display an image. The type of the display panel PN that displays the image is not particularly limited. The display panel PN may be a self-luminescent display panel such as an Organic Light Emitting Display (OLED) panel. Alternatively, the display panel PN may be a non-self-luminescent display panel such as a Liquid Crystal Display (LCD) panel, an Electro-Phoretic Display (EPD) panel, or an Electro-Wetting Display (EWD) panel. When the non-self-luminescent display panel is used as the display panel PN of the display device DD in accordance with the exemplary embodiment of the invention, the display device DD may further include a backlight unit for supplying light to the display panel PN.

The display panel PN may include a substrate SUB, a selective light transmitting layer LBL, a display module DM, and a thin film encapsulation TFE. In an exemplary embodiment of the invention, the display module DM may include a display element layer DPL including light emitting elements LD and a pixel circuit layer PCL including circuit elements for driving the light emitting elements LD.

The substrate SUB is a base substrate of the display panel PN, and may be substantially a transparent transmissive substrate. In some exemplary embodiments, the substrate SUB may be a rigid substrate including glass or tempered glass, or a flexible substrate made of plastic. In an exemplary embodiment of the invention, the substrate SUB may be a flexible substrate.

The pixel circuit layer PCL may be disposed on one surface (e.g., an upper surface) of the substrate SUB, and include at least one conductive layer. In an example, the pixel circuit layer PCL may include a plurality of circuit elements formed in each of pixel regions PXA to constitute a pixel circuit of a corresponding representative pixel PXL and lines for supplying various power sources and signals for driving the pixels PXL. Therefore, the pixel circuit layer PCL may include various circuit elements such as at least one transistor and at least one capacitor and a plurality of conductive layers for constituting lines connected to the circuit elements. Also, the pixel circuit layer PCL may include at least one insulating layer provided between the plurality of conductive layers. Also, the pixel circuit layer PCL may include fan-out lines disposed in the non-display region NDA of the display panel PN to supply power sources and signals, which correspond to lines connected to the pixels PXL.

The display element layer DPL may be disposed on the one surface of the substrate SUB including the pixel circuit layer PCL. In some exemplary embodiments, the display element layer DPL may include a plurality of light emitting elements LD connected to the circuit elements and/or the lines of the pixel circuit layer PCL through contact holes, etc. In an example, the display element layer DPL may include at least one light emitting element LD disposed in each of the pixel regions PXA. In an exemplary embodiment of the invention, the light emitting elements LD may be an organic light emitting diodes or subminiature light emitting elements using a structure obtained by growing an inorganic crystal structure.

The thin film encapsulation TFE may be disposed on the top of the display element layer DPL to cover at least the display region DA.

The selective light transmitting layer LBL may be located between the substrate SUB and the pixel circuit layer PCL in at least the sensing region SA. In an example, the selective light transmitting layer LBL may be disposed on the one surface of the substrate SUB. The selective light transmitting layer LBL may include a plurality of pin holes PIH and a light blocking pattern LBP.

The light blocking pattern LBP may be made of a light-blocking and/or light-absorbing material. In an example, the light blocking pattern LBP may be an opaque metal layer disposed between adjacent pin holes PIH. The pin holes PIH may be through holes penetrating at least one region of the light blocking pattern LBP.

The selective light transmitting layer LBL may include a plurality of pin holes PIH uniformly provided in the light blocking pattern LBP to have a certain size and a certain distance. However, exemplary implementations of the invention are not limited thereto, and the size, shape, number, resolution, and/or arrangement structure of the pin holes PIH may be variously modified. For example, the pin holes PIH may be irregularly provided in the light blocking pattern LBP.

The pin holes PIH may be formed to have a size and a distance, which are appropriate enough to sense a clearer shape of a fingerprint while preventing diffraction of incident light. For example, the width of each of the pin holes PIH may be set to about ten times or more of that of the wavelength of incident light so as to prevent diffraction of the light. The pin holes PIH may be spaced apart from each other at a constant distance. The pin holes PIH may form a grid arrangement as shown in FIG. 3. The distance between the pin holes PIH may be determined based on the distance between the selective light transmitting layer LBL and the light sensing array layer LSL, the wavelength of incident light, and the Field of View (FOV) required for the pin holes PIH. For example, three or fifteen pixels PXL may be located between two neighbor (or adjacent) pin holes PIH so as to sense a relatively clear shape of a fingerprint, but exemplary embodiments of the invention are not limited thereto. In some exemplary embodiments, fifteen or more pixels PXL or three or less pixels PXL may be located between two neighbor (or adjacent) pin holes PIH.

Each of the pin holes PIH may be provided in a generally circular shape when viewed in plan, but exemplary embodiments of the invention are not limited thereto. In some exemplary embodiments, the pin holes PIH may be provided in various shapes including a generally regular triangular shape, a generally square shape, a generally regular hexagonal shape, and the like. The pin holes PIH may have a substantially uniform density (resolution) throughout the whole of the sensing region SA, but exemplary embodiments of the invention are not limited thereto. In some exemplary embodiments, the density of the pin holes PIH may be high in one region of the sensing region SA, and be lower in another region of the sensing region SA. Each of the pin holes PIH may valid hole having a focal point F on which reflective light RL incident on the light sensing array layer LSL converges.

Some of light incident on the selective light transmitting layer LBL may be blocked by the light blocking pattern LBP, and some of the other light may reach the light sensing array layer LSL by passing through the pin holes PIH. The selective light transmitting layer LBL may allow reflected light RL reflected from an object, e.g., a fingerprint of a user, which is located on the first surface SF1 of the display device DD, to be selectively transmitted therethrough. The above-described pin holes PIH may mean optical holes. Each of the pin holes PIH may be a kind of through hole or light transmitting hole.

In the above-described display device DD, the selective light transmitting layer LBL is disposed between the display element layer DPL and the light sensing array layer LSL to allow only some light (e.g., reflective light RL) to be selectively transmitted therethrough, thereby constituting an optical system for controlling a path of light, etc.

The above-described selective light transmitting layer LBL may correspond to the display region DA of the display panel PN, and have a size (or area) greater than or equal to that of the display region DA. In an example, when the sensing region SA is the whole of the display region DA, the selective light transmitting layer LBL may have a size (or area) greater than or equal to that of the display region DA. In another example, when the sensing region SA is a portion of the display region DA, the selective light transmitting layer LBL may have a size (or area) that is greater than or equal to that of the sensing region SA and is equal to or smaller than that of the display region DA, or have a size (or area) equal to that of the sensing region SA. In still another example, when the sensing region SA is a portion of the display region DA, the selective light transmitting layer LBL may have a size (or area) equal to that of the sensing region SA.

The light sensing array layer LSL may be attached to the other surface (or a lower surface) of the substrate SUB to overlap with at least one region of the display panel PN. In an example, the light sensing array layer LSL may be disposed to overlap with the display panel PN in the sensing region SA. The light sensing array layer LSL may include a plurality of photo sensors PSR dispersed to a predetermined density (or resolution) and/or a predetermined distance (pitch).

The photo sensors PSR may be implemented with a semiconductor layer or semiconductor chip on which a plurality of photoelectric conversion elements (e.g., a photo diode, a photo transistor, a photo gate, a pinned photo diode, etc.) are formed. In some exemplary embodiments, the photo sensors PSR may be implemented with a semiconductor layer on which an image sensor such as a CMOS Image Sensor (CIS) or Charge Coupled Device (CCD) is formed.

The photo sensors PSR of the light sensing array layer LSL may output, as sensing signals, electrical signals corresponding to reflected light RL received by passing through the pin holes PIH. The reflected light RL received by the respective photo sensors PSR may have different optical characteristics (e.g., different frequencies, different wavelengths, different magnitudes, etc.) according to whether the reflected light RL is caused by valleys or ridges of a fingerprint formed at a finger of a user. Therefore, the photo sensors PSR may output sensing signals (or electrical signals) having different electrical characteristics, corresponding to the optical characteristics of the reflected light RL. The sensing signals output by the photo sensors PSR may be converted into image data to be used for identifying the fingerprint of the user.

In an exemplary embodiment of the invention, the light sensing array layer LSL including the photo sensors PSR and the selective light transmitting layer LBL including the pin holes PIH may constitute an optical system of the fingerprint sensor in the sensing region SA of the display device DD.

In an exemplary embodiment of the invention, when the pixels PXL, the pin holes PIH, and the photo sensors PSR of the sensing region SA are aligned, the diameter d and the thickness T of each of the pin holes PIH may correspond to parameters for determining an angle $\theta$ of view with respect to upper and lower surfaces, based on each of the pin holes PIH. The sizes, distances, and/or resolutions of the light sensing array layer LSL including the photo sensors PSR and the selective light transmitting layer LBL including the pin holes PIH are controlled, so that the above-described parameters can be determined.

The touch sensor TS may be disposed on a surface on which an image is displayed in the display panel PN to receive a touch input and/or a hover input of a user. The touch sensor TS may recognize a touch input and/or a hover input of the display device DD by sensing a touch capacitance through contact and/or proximity of a separate input means such as a hand of a user or a conductor similar thereto. The touch input may mean that the touch sensor TS is directly touched (or contacted) by a hand of a user or a separate input means, and the hover input may mean that a hand of a user or a separate input means exists in the vicinity of the display device DD including the touch sensor TS but does not touch the touch sensor TS.

Also, the touch sensor TS may sense a touch operation of a user, and move an object displayed in the display device DD from a position at which the object is originally displayed to another position. The touch operation may include at least one touch among a single touch, a multi-touch, and a touch gesture. In an example, there may be various touch operations including a specific gesture, such as an operation of enlarging or reducing a text or image by moving a finger of a user by a certain distance in a state in which the finger of the user touches the touch sensor TS on a touch surface of the touch sensor TS.

The window WD is a member disposed at an uppermost end of the display device DD including the display panel PN, and may be substantially a transparent light transmissive substrate. The window WD allows an image from the display panel PN to be transmitted therethrough and reduces external impact, so that the display panel PN can be prevented from being broken or malfunctioning due to the external impact. The external impact may mean a force causing a defect in the display panel PN as an external force that can be expressed as pressure, stress, or the like. The window WD may include a rigid or flexible substrate, and the material constituting the window WD is not particularly limited.

A fingerprint sensing method of the display device DD in accordance with the above-described embodiment will be briefly described as follows. During a fingerprint sensing period in which the photo sensors PSR are activated, the light emitting elements LD provided in the pixels PXL of the sensing region SA may emit light in a state in which a finger (e.g., a fingerprint region) of a user is in contact with or approaches the sensing region SA. In an example, the light emitting elements LD provided in all the pixels PXL of the sensing region SA may simultaneously or sequentially emit light during the fingerprint sensing period. Alternatively, only light emitting elements LD included in some pixels PXL among the pixels PXL of the sensing region SA may emit light at a predetermined distance, or only light emitting elements LD included in some pixels PXL emitting light of a specific color (e.g., light of a short wavelength band such as blue light) among the pixels PXL of the sensing region SA may selectively emit light.

Some of light EL emitted from the pixels PXL may be reflected from the finger of the user and be incident on the photo sensors PRS by passing through the pin holes PiH formed in each layer of the display device DD. A fingerprint shape (fingerprint pattern) of the user may be detected based on differences in the amount of light and/or wavelengths of reflected light RL reflected from ridges and valleys of the fingerprint.

Figure 4:
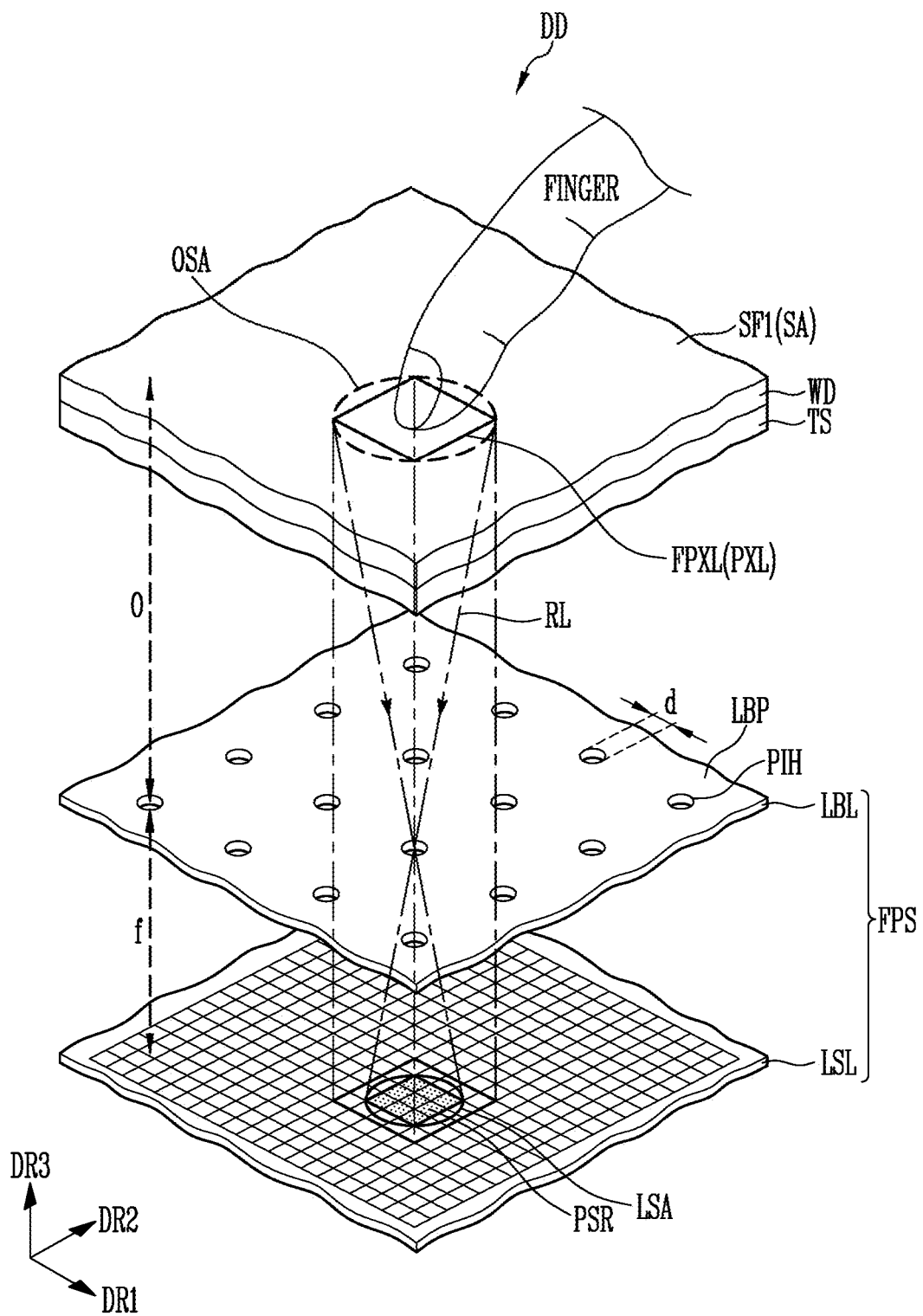
FIG. 4 is a perspective diagram schematically illustrating an exemplary embodiment of the sensing region of the display device including a fingerprint sensor constructed according to principles of the invention.

FIG. 4 is a perspective schematic diagram schematically illustrating an exemplary embodiment of the sensing region of the display device including the fingerprint sensor constructed according to principles of the invention.

Referring to FIGS. 1A to 4, the display device DD may include the display panel PN, the window WD, and a fingerprint sensor FPS. The touch sensor TS may be located between the display panel PN and the window WD.

The fingerprint sensor FPS may be an optical fingerprint sensor that senses light (or rays) reflected by ridges and valleys between the ridges of a fingerprint of a user, thereby recognizing the fingerprint of the user. In an embodiment, the fingerprint sensor FPS may include a selective light transmitting layer LBL formed to allow reflected light RL reflected by the fingerprint to pass therethrough and a light sensing array layer LSL formed to generate electrical signals by sensing the reflected light RL passing through the selective light transmitting layer LBL.

In FIG. 4, the selective light transmitting layer LBL is illustrated as a component independent from the display panel PN so as to conveniently describe the selective light transmitting layer LBL along with the light sensing array layer LSL that constitute the fingerprint sensor FPS, but exemplary implementations of the invention are not limited thereto.

In some exemplary embodiments, in a packaging process of the light sensing array layer LSL when the fingerprint sensor FPS is implemented, the selective light transmitting layer LBL may be staked on the light sensing array layer LSL. Alternatively, in a process for implementing the light sensing array layer LSL, the selective light transmitting layer LBL may be stacked in a layer form on at least one layer constituting the light sensing array LSL. That is, the fingerprint sensor FPS may be implemented in a form in which the selective light transmitting layer LBL is embedded in the light sensing array layer LSL, and a packaging process may be performed on the light sensing array layer LSL having the selective light transmitting layer LBL embedded therein. That is, in some exemplary embodiments, the selective light transmitting layer LBL and the light sensing array layer LSL may be integrally formed. However, exemplary implementations of the invention are not limited thereto. In some exemplary embodiments, the selective light transmitting layer LBL may be disposed between the substrate SUB and the pixel circuit layer PCL of the display panel PN as shown in FIG. 2. The selective light transmitting layer LBL along with the light sensing array layer LSL may constitute the fingerprint sensor FPS with the substrate SUB interposed therebetween.

The selective light transmitting layer LBL may be implemented in various manners by using a material having low light transmittance and low reflectibility. In an example, the selective light transmitting layer LBL may have low reflectibility (or high absorptivity) while blocking light (or ray), and be implemented by using a material of which hardness can be maintained in spite of a change in temperature or humidity.

In an exemplary embodiment of the invention, the display module DM of the display panel PN and the selective light transmitting layer LBL may be disposed generally parallel to each other. Accordingly, light (or rays) EL from a plurality of light emitting elements LD in the display module DM may be transferred in the direction of a fingerprint located at the window WD, and reflected light RL reflected by the fingerprint may be transferred to the selective light transmitting layer LBL within an angle θ of view, which is formed by pin holes PIH of the selective light transmitting layer LBL.

The fingerprint sensor FPS may sense a fingerprint in contact with or approaches the display device DD. When a fingerprint of a user is placed on the first surface SF1 of the display device DD, light emitted from the light emitting elements LD in the display module DM may become a light source to be transferred to and reflected from the fingerprint of the user, and the reflected light RL may be transferred to the light sensing array layer LBL through the pin holes PIH of the selective light transmitting layer LBL by being transmitted (or passing) through the display module DM and the substrate SUB.

The light sensing array layer LSL may include a plurality of photo sensors PSR. Each of the photo sensors PSR sense reflected light RL reflected by different regions of a fingerprint, and generate electrical signals corresponding to the sensed reflected light RL. Each of the photo sensors PSR may generate an electrical signal corresponding to light reflected from a ridge of the fingerprint, or may generate an electrical signal corresponding to light reflected from a valley between ridges. Amounts (or intensities) of light sensed by the respective photo sensors PSR may be different depending on the shape of the fingerprint from which the light is reflected, and electrical signals having different levels may be generated according to the amounts of the sensed light. That is, each of the electrical signals from the plurality of photo sensors PSR may include brightness information (or image information). Whether a region corresponding to each of the photo sensors PSR is a ridge or valley may be determined through a processing operation on the electrical signal, and the entire image of the fingerprint may be arranged by combining the determined information.

Regions of a fingerprint, which are optically sampled in the display device DD, may be defined. In an example, a plurality of fingerprint pixels FPXL may be defined corresponding to the plurality of photo sensors PSR of the light sensing array layer LSL, and each fingerprint pixel FPXL may correspond to a subject region shown by one pin hole PIH and one photo sensor PSR. In an exemplary embodiment of the invention, each fingerprint pixel FPXL may mean one representative pixel PXL included in one region of the sensing region SA in which a fingerprint of a user is sensed when the user is in contact with or approaches the sensing region SA. However, exemplary embodiments of the invention are not limited thereto.

In some exemplary embodiments, a plurality of pixels PXL included in one region of the sensing region SA may form one group to constitute the respective fingerprint pixels FPXL.

The shape and size of the fingerprint pixel FPXL may be determined according to the distance O between the display panel PN and the selective light transmitting layer LBL, the distance f between the selective light transmitting layer LBL and the light sensing array layer LSL, the thickness T of the selective light transmitting layer LBL, the diameter d and shape of each pin hole PIH, etc.

A region reflecting light that may pass through one pin hole PIH may be included in each fingerprint pixel FPXL, and the corresponding region may be defined as an optical sampling region OSA. According to the optical sampling region OSA, a light sensing region LSA corresponding to the optical sampling region OSA may be defined in the light sensing array layer LSL. The light sensing region LSA corresponds to an optical sampling region OSA, and may mean a region in which reflected light RL from the optical sampling region OSA is incident upon photo sensors PSR of the light sensing array layer LSL by passing through one pin hole PIH.

As described above, the optical fingerprint sensor FPS is easily implemented using some components, e.g., the selective light transmitting layer LBL and the light sensing array layer LSL, which are included in the display device DD, so that a large-area fingerprint sensor FPS capable of sensing the whole of a finger of a user can be implemented. That is, a large-area fingerprint sensor FPS having a size (or area) greater than that of the finger of the user can be implemented.

FIGS. 5A to 5D are plan views illustrating exemplary embodiments of arrangements of fingerprint pixels, pin holes, and photo sensors constructed according to principles of the invention. Specifically, FIGS. 5A to 5D are plan views illustrating relative sizes, density (or resolutions), and/or relative positions of fingerprint pixels FPXL, pin holes PIH, and photo sensors PSR, which are located in the sensing region SA, in accordance with various exemplary embodiments.

Figure 5A:
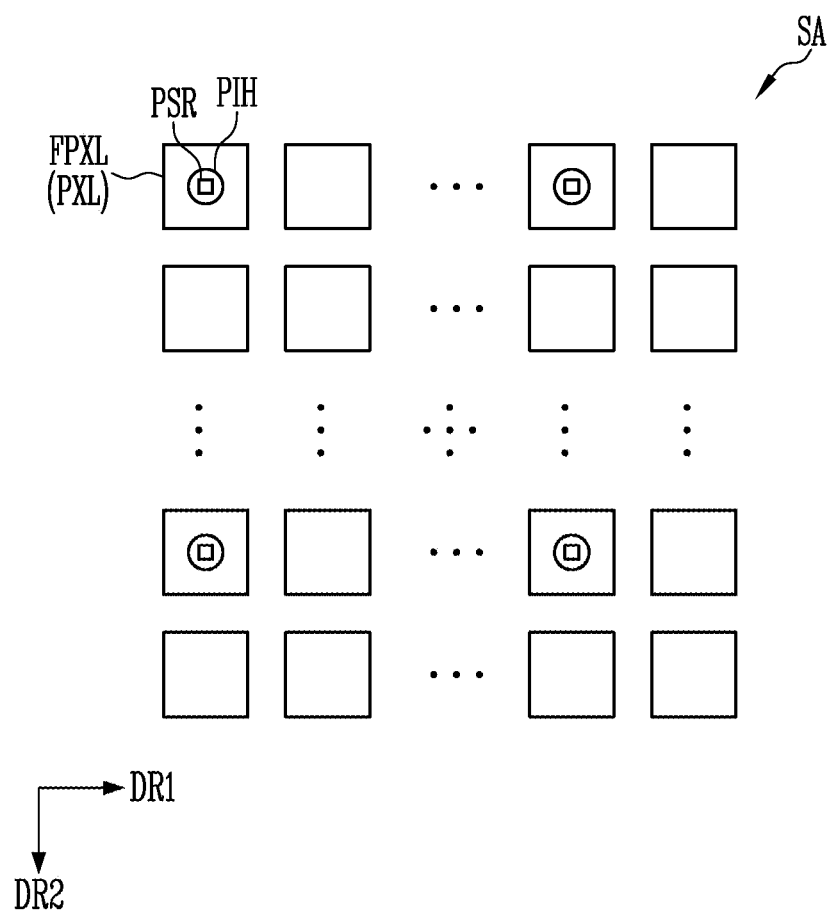
FIGS. 5A to 5D are plan views illustrating exemplary embodiments of arrangements of fingerprint pixels, pin holes, and photo sensors constructed according to principles of the invention.

First, referring to FIG. 5A, the sensing region SA may include pin holes PIH and photo sensors PSR, each of which number is smaller than that of fingerprint pixels FPXL (PXL). For example, the pin holes PIH and the photo sensors PSR have a size smaller than that of the fingerprint pixels FPXL (PXL), and may be dispersed in the sensing region SA at a density lower than that of the fingerprint pixels FPXL (PXL).

While an embodiment in which the pin holes PIH and the photo sensors PSR has a density lower than that of the fingerprint pixels FPXL (PXL) is illustrated in FIG. 5, exemplary implementations of the invention are not limited thereto. In some exemplary embodiments, the pin holes PIH and the photo sensors PSR may be dispersed in the sensing region SA to have a number and distance, which are substantially equal to each other, so as to generally correspond one-to-one (1:1) to each other. In an example, the pin holes PIH and the photo sensors PSR may be disposed to overlap with each other while forming one-to-one (1:1) pairs. In some exemplary embodiments, a pin hole PIH and a photo sensor PSR, which form a pair, may be disposed to overlap with any one fingerprint pixel FPXL (PXL) disposed in the sensing region SA, but exemplary implementations of the invention are not limited thereto. In an example, the pin holes PIH and the photo sensors PSR may be alternately disposed not to overlap with each other, or be disposed not to overlap with the fingerprint pixels FPXL (PXL).

The pin holes PIH and the photo sensors PSR may have sizes equal to or different from each other. That is, the relative sizes and densities of the pin holes PIH and the photo sensors PSR are not particularly limited.

Figure 5B:
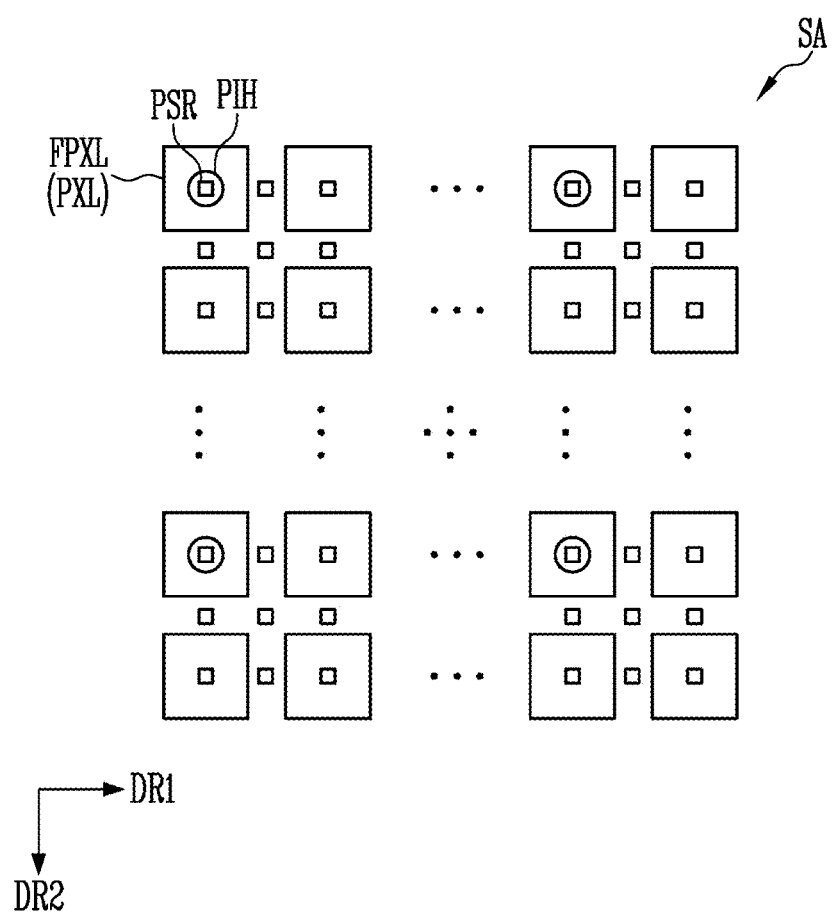

Referring to FIG. 5B, the sensing region SA may include pin holes PIH of which number is smaller than that of the fingerprint pixels FPXL (FPXL) and photo sensors PSR of which number is greater than that of the fingerprint pixels FPXL (PXL). In an example, the pin holes PIH and the photo sensors PSR may have sizes smaller than that of the fingerprint pixels FPXL (PXL). The pin holes PIH may be dispersed in the sensing region SA at a density lower than that of the fingerprint pixels FPXL (PXL), and the photo sensors PSR may be densely dispersed in the sensing region SA at a density higher than that of the fingerprint pixels FPXL (PXL).

At least some of the photo sensors PSR may overlap with at least one pin hole PIH and/or at least one fingerprint pixel FPXL (PXL), but exemplary implementations of the invention are not limited thereto. In some exemplary embodiments, some of the photo sensors PSR may be disposed to overlap with the pin holes PIH and/or the fingerprint pixels FPXL (PXL), and other some of the photo sensors PSR may be disposed at gaps between the fingerprint pixels FPXL (PXL).

Figure 5C:
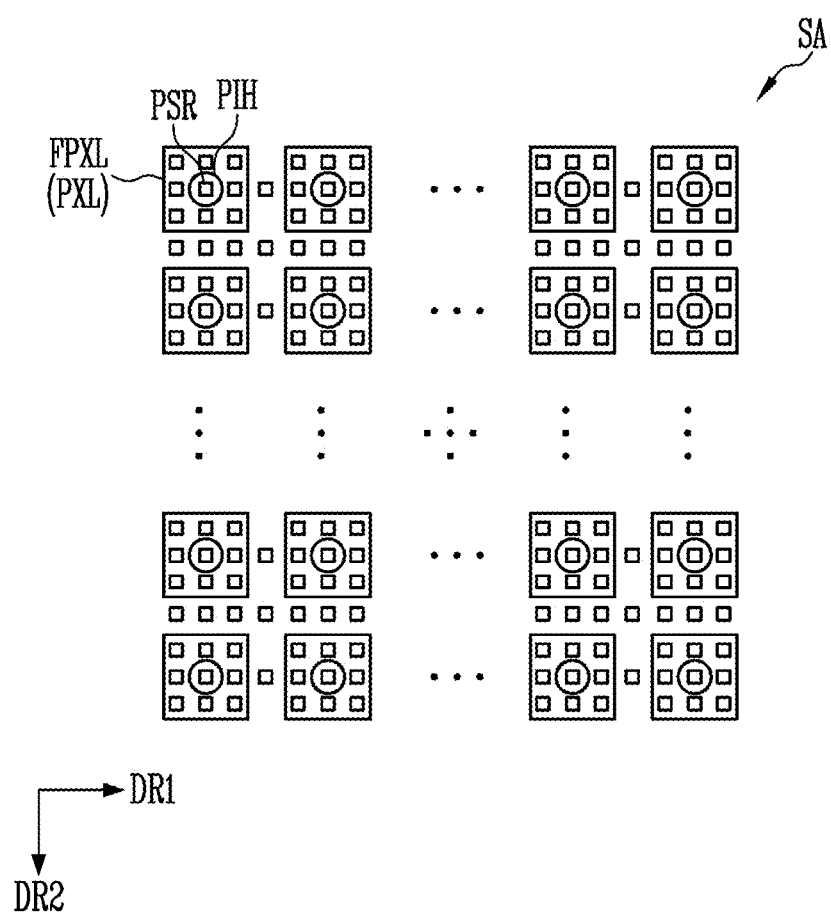
Figure 5D:
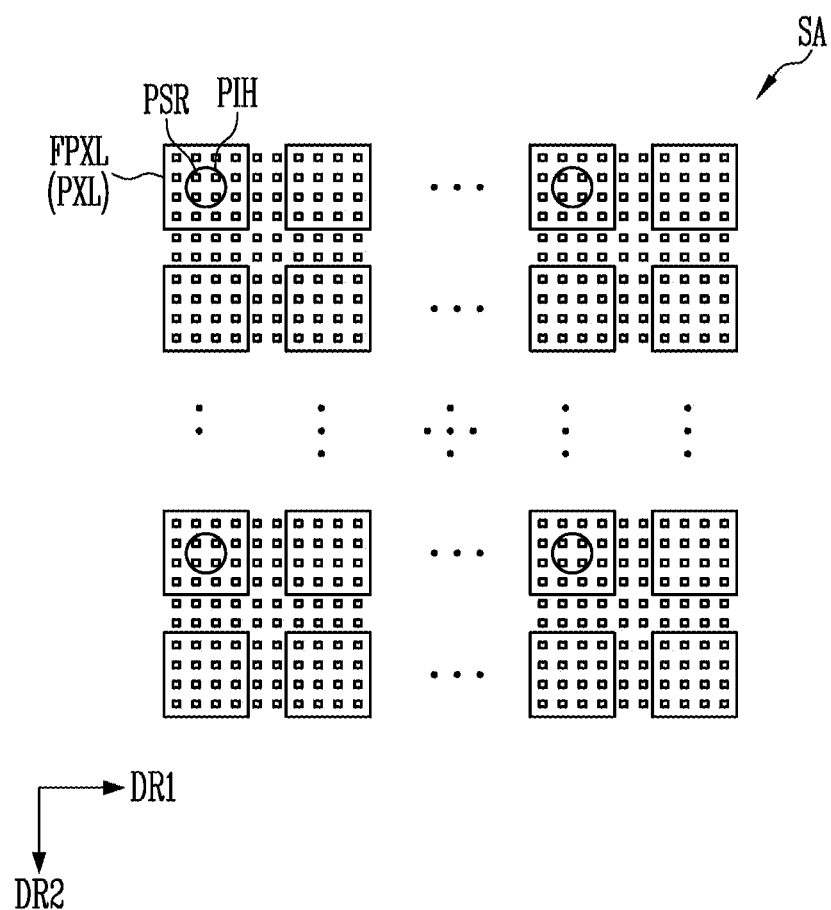

Referring to FIGS. 5C and 5D, photo sensors PSR may be dispersed in the sensing region SA to have a size smaller than that of the embodiment shown in FIG. 5B and a density higher than that of the embodiment shown in FIG. 5B. In an example, the photo sensors PSR may be dispersed in the sensing region SA at a distance that is about 1/10 to about 1/100 the distance of the distance between the pin holes PIH. Thus, the photo sensors PSR are disposed in the sensing region SA densely enough not to require a one-to-one (1:1) alignment between the fingerprint pixels FPXL (PXL) and/or the pin holes PIH, and accordingly, occurrence of moire can be prevented or minimized regardless of the alignment of the fingerprint pixels FPXL (PXL) and/or the pin holes PIH and the photo sensors PSR.

In some exemplary embodiments, the pin holes PIH may be dispersed in the sensing region SA at densities equal to or different from each other. In an example, the pin holes PIH may be dispersed in the sensing region SA at a density equal to that of the fingerprint pixels FPXL (PXL) as shown in FIG. 5C, or be dispersed in the sensing region SA at a density lower than that of the fingerprint pixels FPXL (PXL) as shown in FIG. 5D.

While an embodiment in which the pin holes PIH and the photo sensors PSR are arranged in a regular array form in the sensing region SA is illustrated in FIGS. 5A to 5D, exemplary implementations of the invention are not limited thereto. In some exemplary embodiments, the pin holes PIH and/or the photo sensors PSR may be irregularly dispersed in the sensing region SA, or be dispersed at different densities or different arrangement structures according to each region or interval of the sensing region SA.

The arrangement structure and the like of the fingerprint pixels FPXL (PXL), the pin holes PIH, and the photo sensors PSR are not limited to the above-described exemplary embodiments. For example, the shapes, arrangement forms, relative sizes, numbers, densities, and/or relative positions of the fingerprint pixels FPXL (PXL), the pin holes PIH, and/or the photo sensors PSR may be variously modified.

Figure 6:
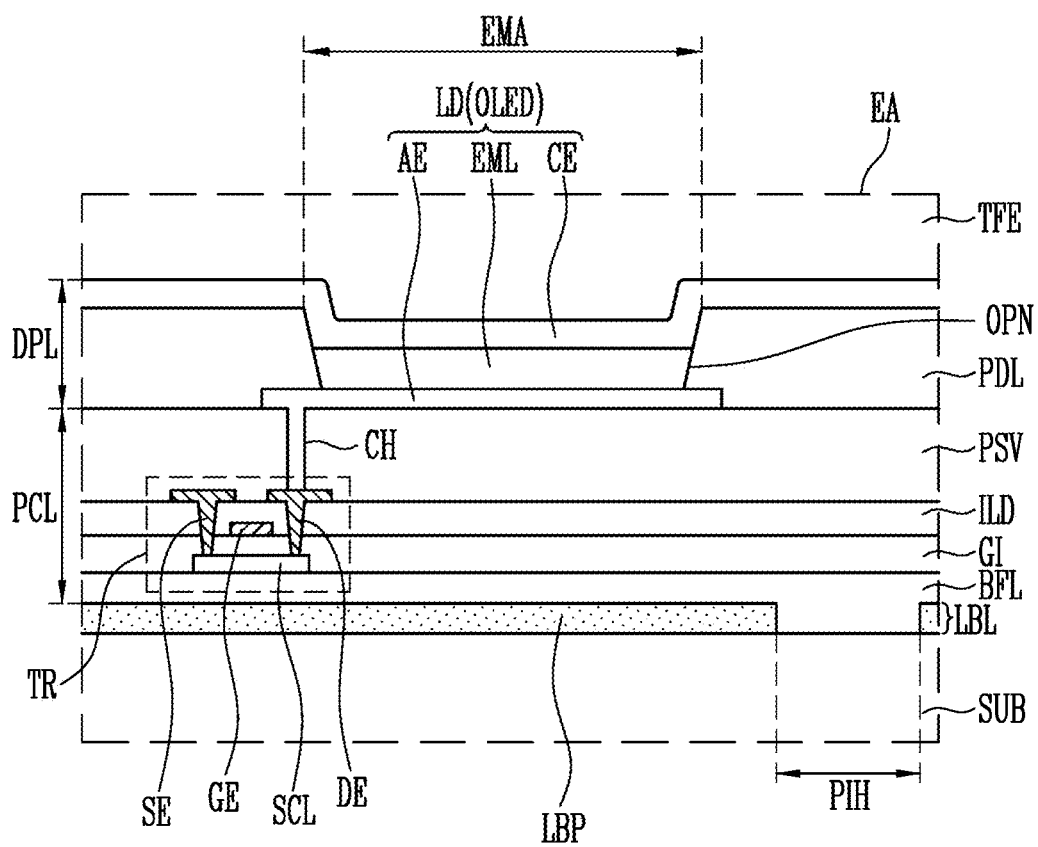
FIG. 6 is an enlarged cross-sectional view of region EA shown in FIG. 2.

FIG. 6 is an enlarged cross-sectional view of region EA shown in FIG. 2.

In FIG. 6, the region EA shown in FIG. 2, e.g., the pixel circuit layer PCL and the display element layer DPL, which are included in one representative pixel, will be described in more detail. In particular, at least one transistor TR provided in the pixel circuit layer PCL and light emitting element LD (OLED) provided in the display element layer DPL will be illustrated.

Referring to FIGS. 1A to 6, one representative pixel PXL (hereinafter, referred to as 'pixel') may include a substrate SUB, a pixel circuit layer PCL provided on the substrate SUB, and a display element layer DPL provided on the pixel circuit layer PCL.

The pixel circuit layer PCL may include a buffer layer BFL, at least one transistor TR, and a protective layer PSV. The display element layer DPL may include a light emitting element LD (OLED) emitting light. For convenience of description, after the pixel circuit layer PCL is first described, the display element layer DPL will be then described.

The buffer layer BFL may be provided on the substrate SUB. The buffer layer BFL may prevent an impurity from being diffused into the transistor TR. The buffer layer BFL may be provided in a single layer, but be provided in a multi-layer including at least two layers. When the buffer layer BFL is provided in the multi-layer, the layers may be formed of the same material or be formed of different materials. The buffer layer BFL may be omitted according to a material and/or a process condition of the substrate SUB. The buffer layer BFL may be an inorganic insulating layer including an inorganic material or an organic insulating layer including an organic material.

The transistor TR may include a driving transistor electrically connected to the light emitting elements LD (OLED) of the display element layer DPL to drive the light emitting element LD (OLED). The transistor TR may include a switching transistor for switching the driving transistor.

The transistor TR may include a semiconductor layer SCL, a gate electrode GE, a first terminal SE, and a second terminal DE. The first terminal SE may be any one of a source electrode and a drain electrode, and the second terminal DE may be the other electrode. For example, when the first terminal SE is a source electrode, the second terminal DE may be the drain electrode.

The semiconductor layer SCL may be disposed on the buffer layer BFL. The semiconductor layer SCL may include a first region in contact with the first terminal SE and a second region in contact with the second terminal DE. A region between the first region and the second region may be a channel region. The semiconductor layer SCL may be a semiconductor pattern made of poly silicon, amorphous silicon, an oxide semiconductor, etc. The channel region is a semiconductor pattern undoped with an impurity, and may be an intrinsic semiconductor. Each of the first region and the second region may be a semiconductor pattern doped with the impurity.

The gate electrode GE may be provided on the semiconductor layer SCL with a gate insulating layer GI interposed therebetween. The gate insulating layer GI may be an inorganic insulating layer including an inorganic material.

The first terminal SE and the second terminal DE may be respectively in contact with the first region and the second region of the semiconductor layer SCL through holes penetrating an interlayer insulating layer ILD and the gate insulating layer GI. The interlayer insulating layer ILD may be an inorganic insulating layer including an inorganic material, but exemplary implementations of the invention are not limited thereto. In some exemplary embodiments, the interlayer insulating layer ILD may be an organic insulating layer including an organic material.

Although a case where each of the first and second terminals SE and DE of the transistor TR is a separate electrode electrically connected to the semiconductor layer SCL is described in the above embodiment, the exemplary implementations of the invention are not limited thereto. In some exemplary embodiments, the first terminal SE of the transistor TR may be one of the first and second regions adjacent to the channel region of the semiconductor layer SCL, and the second terminal DE of the transistor TR may be the other of the first and second regions adjacent to the channel region of the semiconductor layer SCL. Therefore, the second terminal DE of the transistor TR may be electrically connected to the light emitting element LD (OLED) of the display element layer DPL through a connection means including a bridge electrode, a contact electrode or the like.

In an exemplary embodiment of the invention, the transistor TR included in the pixel circuit layer PCL may be formed as an LTPS transistor, but the exemplary implementations of the invention are not limited thereto. In some exemplary embodiments, the transistor TR may be formed as an oxide semiconductor thin film transistor. Also, in some exemplary embodiments, the pixel circuit layer PCL may include at least one transistor TR implemented with an LTPS thin film transistor and at least one transistor TR implemented with an oxide semiconductor thin film transistor. Additionally, in an exemplary embodiment of the invention, a case where the transistor TR is a thin film transistor having a top gate structure is illustrated as an example, but the exemplary implementations of the invention are not limited thereto. In some exemplary embodiments, the transistor TR may be a thin film transistor having a bottom gate structure.

The protective layer PSV may be provided over the transistor TR. The protective layer PSV may be provided and/or formed over the transistor TR to cover the transistor TR. The protective layer PSV may be provided in a form including an organic insulating layer, an inorganic insulating layer, an organic insulating layer disposed on the inorganic insulating layer. The inorganic insulating layer may include at least one of silicon oxide ($SiO_x$) and silicon nitride ($SiN_x$). The organic insulating layer may include an insulating material that enables light to be transmitted therethrough. For example, the organic insulating layer may include at least one of a photoresist, a polyacrylate resin, an epoxy resin, a phenolic resin, a polyamide resin, a polyimide resin, an unsaturated polyester resin, a polyphenylene ether resin, a polyphenylene sulfide resin, and a benzocyclobutene resin.

Next, the display element layer DPL will be described.

The display element layer DPL may include the light emitting element LD (OLED) provided on the protective layer PSV. The light emitting element LD (OLED) may include a first electrode AE, an emitting layer EML, and a second electrode CE.

One of the first electrode AE and the second electrode CE may be an anode electrode, and the other of the first electrode AE and the second electrode CE may be a cathode electrode. For example, the first electrode AE may be the anode electrode, and the second electrode CE may be the cathode electrode. When the light emitting element LD (OLED) is a top-emission organic light emitting element, the first electrode AE may be a reflective electrode, and the second electrode CE may be a transmissive electrode. In an exemplary embodiment of the invention, a case where the light emitting element LD (OLED) is the top-emission organic light emitting element, and the first electrode AE is the anode electrode is described as an example.

The first electrode AE may be electrically connected to the transistor TR of the pixel circuit layer PCL through a contact hole CH penetrating the protective layer PSV. In an example, the first electrode AE may be electrically connected to the second terminal DE of the transistor TR of the pixel circuit layer PCL through the contact hole CH of the protective layer PSV. The first electrode AE may include a reflective layer capable of reflecting light and a transparent conductive layer disposed on the top or bottom of the reflective layer. At least one of the transparent conductive layer and the reflective layer may be electrically connected to the transistor TR.

A pixel defining layer PDL having an opening OPN exposing a portion of the first electrode AE, e.g., an upper surface of the first electrode AE may be further disposed on the protective layer PSV. The pixel defining layer PDL may include an organic insulating layer. For example, the pixel defining layer PDL may include at least one of a polystyrene, a polymethylmethacrylate (PMMA), a polyacrylonitrile (PAN), a polyamide (PA), a polyimide (PI), a polyarylether (PAE), a heterocyclic polymer, a parylene, an epoxy, a benzocyclobutene (BCB), a siloxane based resin, and a silane based resin.

The representative pixel PXL may be disposed in the pixel region PXA of the display region DA. In an exemplary embodiment of the invention, the pixel region PXA may include an emission region EMA in which light is emitted from the light emitting element LD (OLED) and a peripheral region adjacent to the emission region EMA. The peripheral region may be a region from which the light is not emitted, and the emission region EMA may be a region with the first electrode AE, the emitting layer EML, and the second electrode CE overlap. The emission region EMA may be defined to a partial region of the first electrode AE exposed by the opening OPN of the pixel defining layer PDL.

The emitting layer EML may be disposed on the upper surface of the first electrode AE, which is exposed by the opening OPN of the pixel defining layer PDL. The emitting layer EML may have a multi-layered thin film structure including at least a light generation layer. For example, the emitting layer EML may include a hole injection layer for injecting holes, a hole transport layer having an excellent hole transporting property, the hole transport layer for increasing the opportunity for holes and electrons to be re-combined by suppressing the movement of electrons that fail to be combined in the light generation layer, the light generation layer for emitting light through the re-combination of the injected electrons and holes, a hole blocking layer for suppressing the movement of holes that fail to be combined in the light generation layer, an electron transport layer smoothly transporting electrons to the light generation layer, and an electron injection layer for injecting electrons.

The color of light generated in the light generation layer may be one of red, green, blue, and white, but exemplary implementations of the invention are not limited thereto. For example, the color of light generated in the light generation layer may also be one of magenta, cyan, and yellow. The hole injection layer, the hole transport layer, the hole blocking layer, the electron transport layer, and the electron injection layer may be common layers connected in light emitting regions adjacent to each other.

A thin film encapsulation TFE covering the second electrode CE may be provided over the second electrode CE.

The thin film encapsulation TFE encapsulates the display element layer DPL. The thin film encapsulation TFE may be provided in a single layer, but exemplary implementations of the invention are not limited thereto. In some exemplary embodiments, the thin film encapsulation TFE may be provided in a multi-layer. The thin film encapsulation TFE may include a plurality of insulating layers covering the display element layer DPL including the light emitting element LD (OLED). The thin film encapsulation TFE may include at least one inorganic layer and at least one organic layer. For example, the thin film encapsulation TFE may have a structure in which inorganic and organic layers are alternately stacked. In some exemplary embodiments, the thin film encapsulation TFE may be an encapsulation substrate that is disposed on the display element layer DPL and is joined with the substrate SUB through a sealant.

A selective light transmitting layer LBL may be provided between the substrate SUB and the pixel circuit layer PCL. The selective light transmitting layer LBL may include a light blocking pattern LBP and at least one pin hole PIH. The pin hole PIH of the selective light transmitting layer LBL may be located in the selective light transmitting layer LBL to overlap with the emission region EMA of the representative pixel PX, but exemplary implementations of the invention are not limited thereto.

Figure 7:
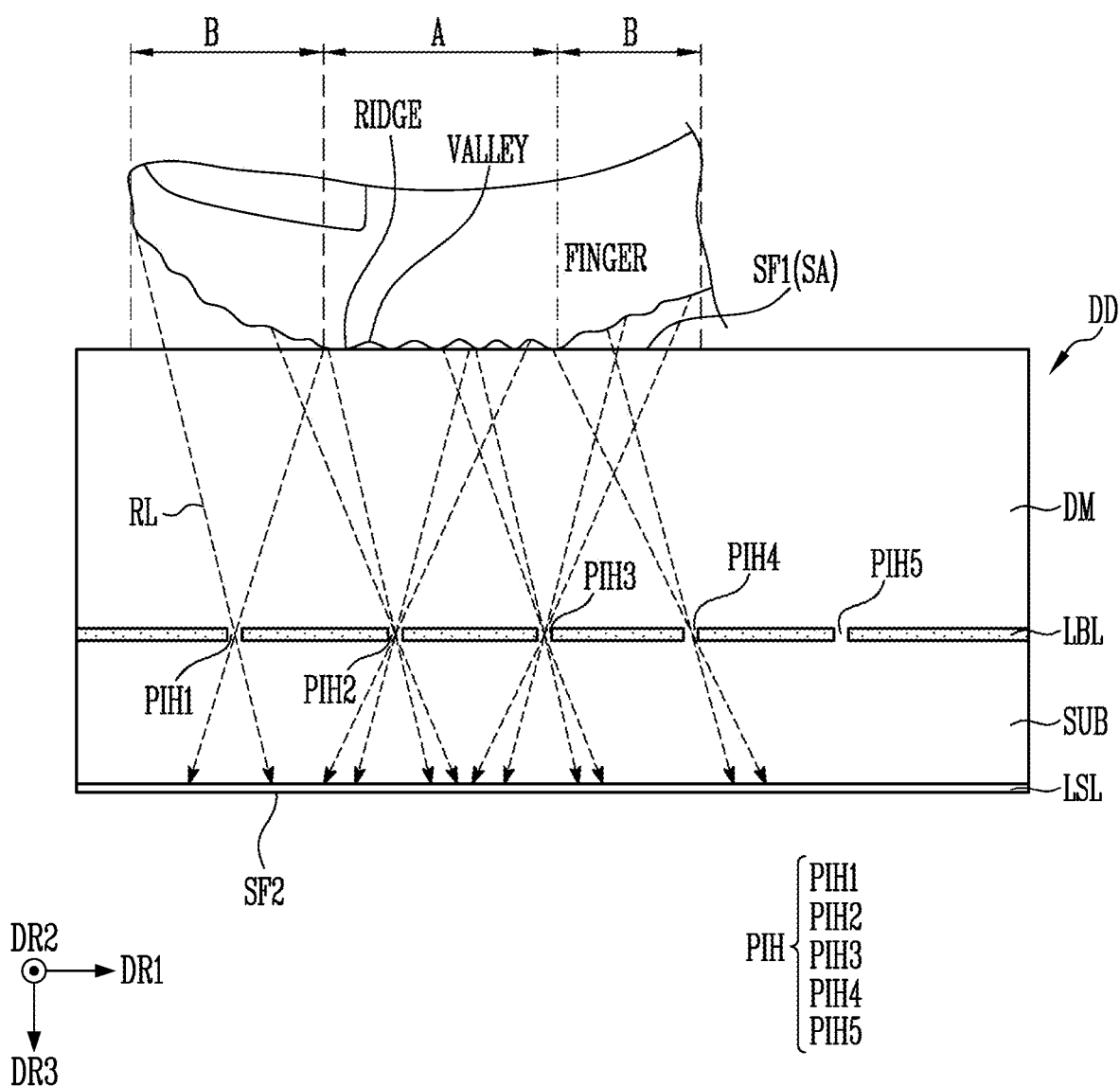
FIG. 7 is a schematic cross-sectional view of an exemplary embodiment of the display device.
Figure 8:
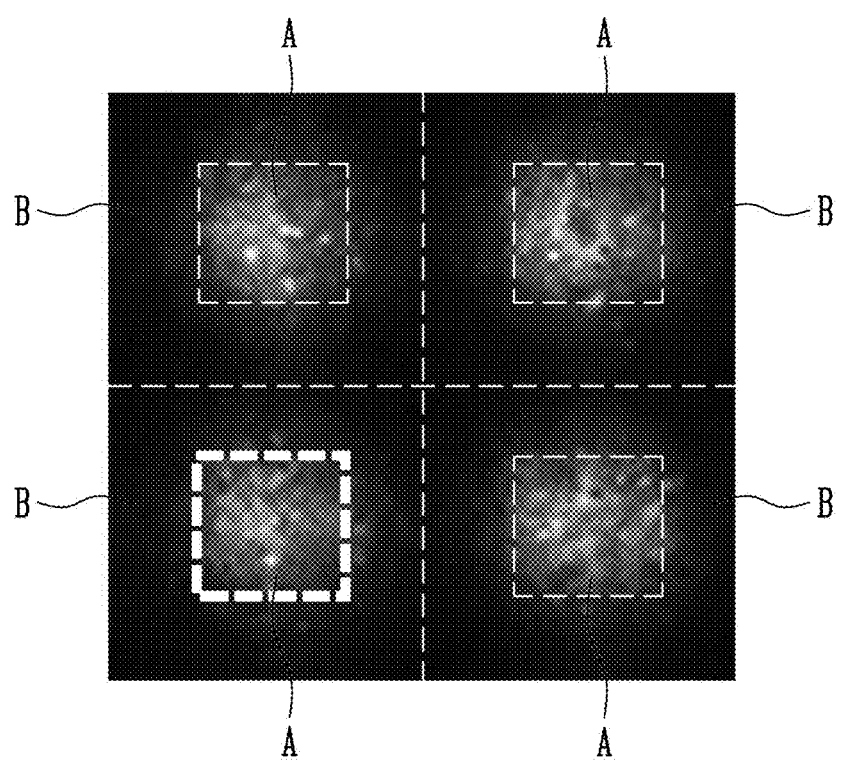
FIG. 8 is an image illustrating an exemplary embodiment of a user's fingerprint image acquired from the light sensing array layer shown in FIG. 7.
Figure 9:
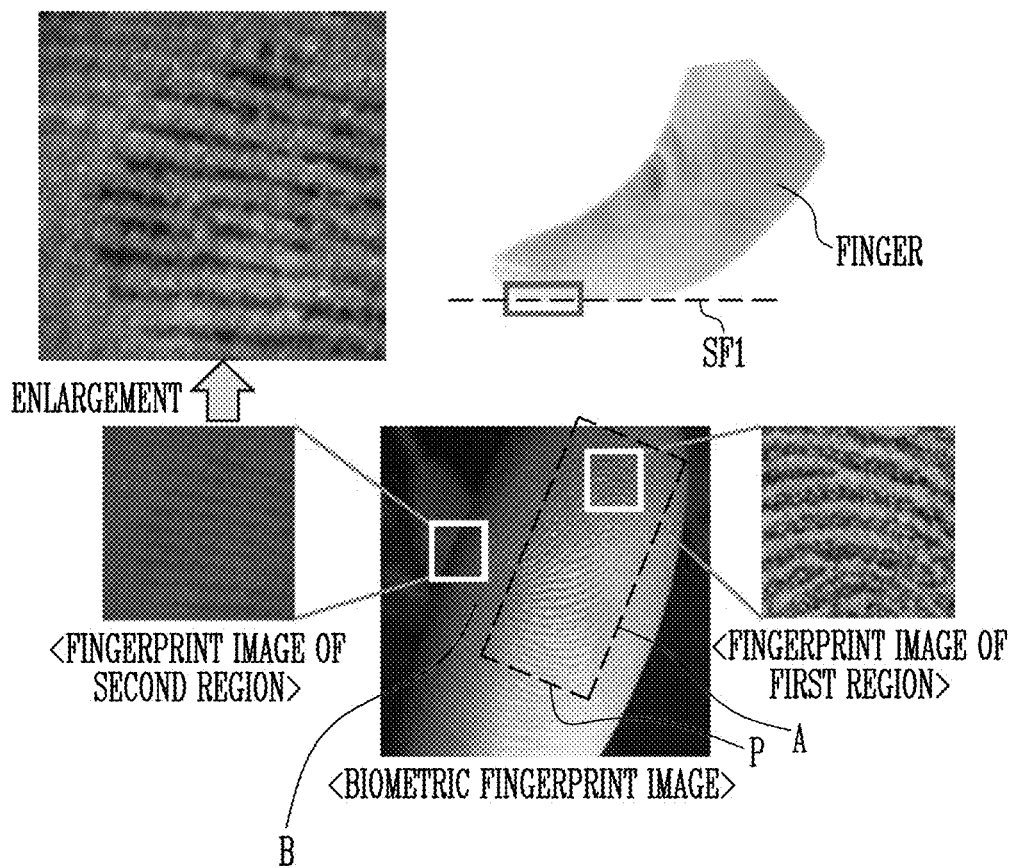
FIG. 9 illustrates images of the user's fingerprint contacting the fingerprint contact surface of an exemplary embodiment of the display device, including enlarged images of the first region and the second region of the fingerprint.
Figure 10:
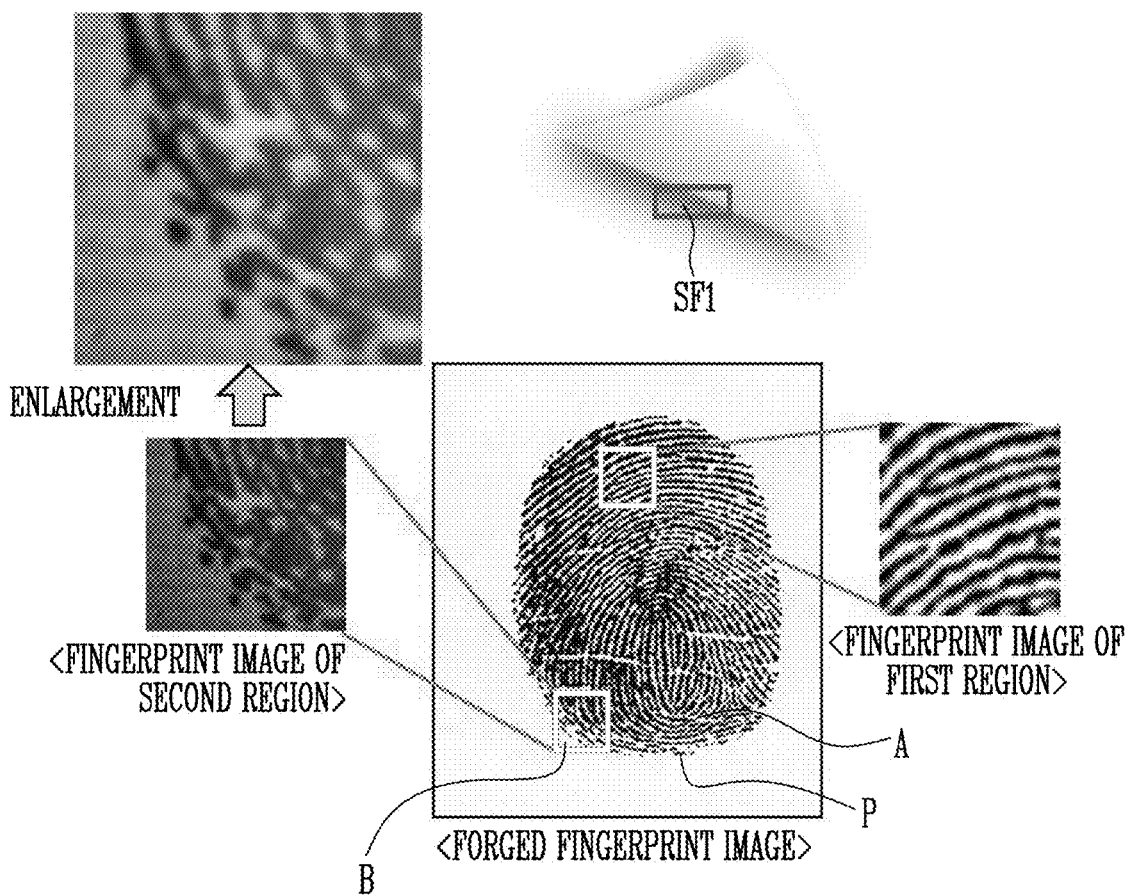
FIG. 10 illustrates images of a forged fingerprint contacting the fingerprint contact surface of an exemplary embodiment of the display device, including enlarged images of the first region and the second region of the forged fingerprint.

FIG. 7 is a schematic cross-sectional view of an exemplary embodiment of the display device. FIG. 8 is an image illustrating an exemplary embodiment of a user's fingerprint image acquired from the light sensing array layer shown in FIG. 7. FIG. 9 illustrates images of the user's fingerprint contacting the fingerprint contact surface of an exemplary embodiment of the display device including enlarged images of the first region and the second region of the fingerprint. FIG. 10 illustrates images of a forged fingerprint contacting the fingerprint contact surface of an exemplary embodiment of the display device, including enlarged images of the first region and the second region of the forged fingerprint.

Referring to FIGS. 7 to 10, when a fingerprint of a user is in contact with the first surface SF1 of the sensing region SA of the display device DD, the light emitting element LD (OLED) of each of fingerprint pixels FPXL (PXL) corresponding to the contact region may be driven, to emit light EL toward the first surface SF1. Hereinafter, for convenience of description, a region in direct contact with the fingerprint of the user in the first surface SF1 of the sensing region SA is referred to as a fingerprint contact surface SF1.

Light emitting elements LD (OLED) of fingerprint pixels FPXL corresponding to the fingerprint contact surface SF1 may simultaneously or sequentially emit light. Light emitted toward a user fingerprint may be reflected by the user fingerprint to pass (or be transmitted) through the display module DM and the selective light transmitting layer LBL and then incident on the light sensing array layer LSL. The photo sensors PSR of the light sensing array layer LSL acquire a fingerprint image of the user by receiving reflected light RL, and provide the acquired fingerprint image to the fingerprint detector FPDP at a predetermined frame rate.

The light sensing array layer LSL may acquire a peripheral image of the user fingerprint by receiving reflected light RL reflected from a peripheral portion of the user fingerprint, and provide the acquired peripheral image to the fingerprint detector FPDP. In an exemplary embodiment of the invention, the peripheral portion of the user fingerprint may mean a region B in which the user fingerprint is not in contact with the first surface SF1 but spaced apart from (or proximate to) the first surface SF1 as a surrounding of a portion A (or fingerprint authentication portion) at which the user fingerprint is in contact with the fingerprint contact surface SF1 of the sensing region SA. Hereinafter, for convenience of description, the portion A (or fingerprint authentication portion) at which the user fingerprint is in contact with the fingerprint contact surface SF1 is referred to as a 'first region A,' and a peripheral portion of the first region A is referred to as a 'second region B.'

The first region A of the user fingerprint and the second region B of the user fingerprint may include may include a valley located and continuously disposed between adjacent ridges, and a brightness difference (or gray level difference) may exist due to the difference between reflected light RL incident on the light sensing array layer LSL for each region. The first region A of the user fingerprint and the second region B of the user fingerprint can be distinguished from each other in a fingerprint image acquired from the light sensing array layer LSL by using such a difference.

As shown in FIG. 7, when the selective light transmitting layer LBL in the sensing region SA for sensing a fingerprint of a user includes first to fifth pinholes PIH1 to PIH5, the light sensing array layer LSL may acquire a fingerprint image for each unit pin hole PIH by receiving light that respectively passes through the first to fifth pin holes PIH1 to PIH5 and then advance toward the light sensing array LSL. For example, when a first region A in direct contact with a user finger and the second region B located at a peripheral portion of the first region A correspond to the first to fourth pin holes PIH1 to PIH4 of the selective light transmitting layer LBL in the sensing region SA for fingerprint authentication, the light sensing array LSL may acquire a fingerprint image for each unit pin hole PIH as shown in FIG. 8 by receiving light that respectively passes through the first to fourth pin holes PIH1 to PIH4 and then advance toward the light sensing array LSL.

Light reflected from the first region A may pass through the first to fourth pin holes PIH1 to PIH4 and then advance toward the light sensing array layer LSL corresponding to each of the first to fourth pin holes PIH1 to PIH4. At the same time, light reflected from the second region B may pass through the first to fourth pin holes PIH1 to PIH4 and then advance toward the light sensing array layer LSL corresponding to each of the first to fourth pin holes PIH1 to PIH4.

The amount (or intensity) of the light reflected from the first region A and the amount (or intensity) of the light reflected from the second region B may be different from each other as shown in FIG. 8. In an example, the amount (or intensity) of the light reflected from the first region A may be larger than the amount (or intensity) of the light reflected from the second region B. Since the first region A is a region in which the user fingerprint is in direct contact with the fingerprint contact surface SF1 and the second region B is a region in which the user fingerprint is not in contact with the fingerprint contact surface SF1, a reflectibility difference between ridges and valleys of the user fingerprint may occur in each region. The first region A and the second region B of the user fingerprint may be distinguished from each other due to these reflectibility differences in the fingerprint image acquired from the light sensing array layer LSL.

An actual fingerprint of a user or a forged fingerprint may be in contact with the fingerprint contact surface SF1 of the display device DD. The forged fingerprint may include a forged fingerprint printed on a transparent film or paper, a forged fingerprint made by pouring a specific material in a fingerprint frame, and the like.

An example of a fingerprint image image-processed in the fingerprint detector FPDP when a fingerprint (hereinafter, referred to as a 'biometric fingerprint') of a user's finger is in contact with the fingerprint contact surface SF1 may be shown in FIG. 9. As illustrated in the fingerprint image, it can be seen that ridges and valleys, which are formed in the biometric fingerprint, are observed in the first region A, and ridges and valleys that are relatively dim as compared with the first region A are observed in the second region B but have continuity with both the ridges and valleys of the first region A.

An example of a fingerprint image image-processed in the fingerprint detector FPDP when a forged fingerprint printed on paper is in contact with the fingerprint contact surface SF1 is shown in FIG. 10. As illustrated in the fingerprint image shown in FIG. 10, it can be seen that a pattern having a shape similar to that of the ridges and the valleys, which are formed in the biometric fingerprint, is observed in the first region A, but an arrangement of pin holes PIH included in the selective light transmitting layer LBL is observed in the second region B. In an example, pin holes PIH forming a grid arrangement may be observed in the second region B.

As described above, while ridges and valleys of the fingerprint may be observed in the first region A of each of the biometric fingerprint and the forged fingerprint, different images may be observed in the second region B of each of the biometric fingerprint and the forged fingerprint. That is, while ridges and valleys of the fingerprint may be observed in the second region B of the biometric fingerprint even though the ridges and valleys of the fingerprint are dim, a grid arrangement of pin holes PIH may be observed in the second region B of the forged fingerprint. In an exemplary embodiment of the invention, whether a fingerprint in contact with the fingerprint contact surface SF1 is a biometric fingerprint or forged fingerprint may be determined through an image observed in the second region B of each of the biometric fingerprint and the forged fingerprint.

The fingerprint detector FPDP extracts an image corresponding to the first region and an image corresponding to the second region B in a fingerprint image acquired from the light sensing array layer LSL, performs preprocessing or synthesis on the extracted images, and then determines similarity of the images or determines whether the images correspond to a grid arrangement of pin holes PIH, so that it can be determined whether a fingerprint in contact with the fingerprint contact surface SF1 of the display device DD is a biometric fingerprint or forged fingerprint.

Figure 12A:
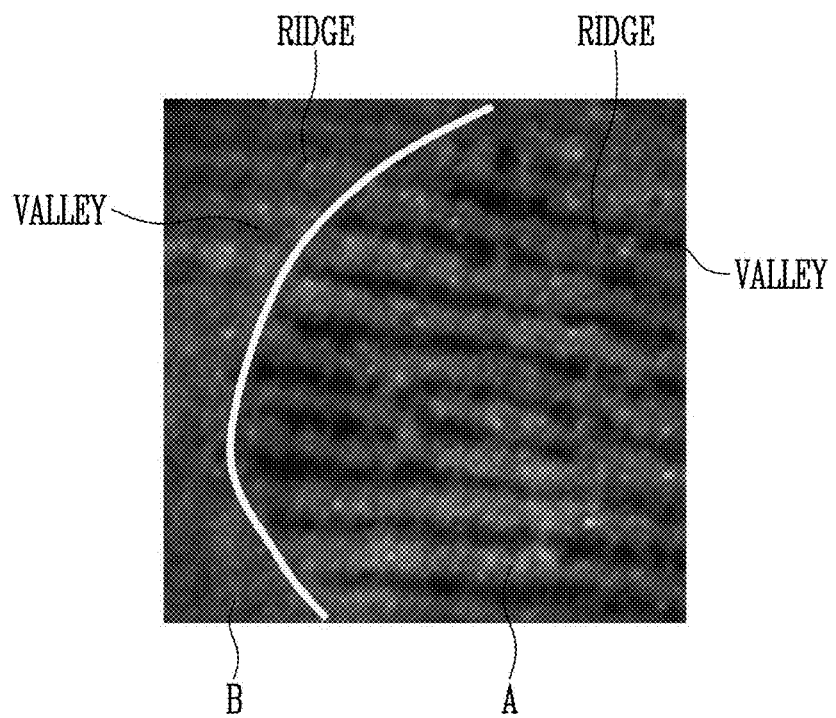
FIG. 12A is an image illustrating an exemplary biometric fingerprint image used in a similarity determination method carried out in the similarity determiner shown in FIG. 11.
Figure 12B:
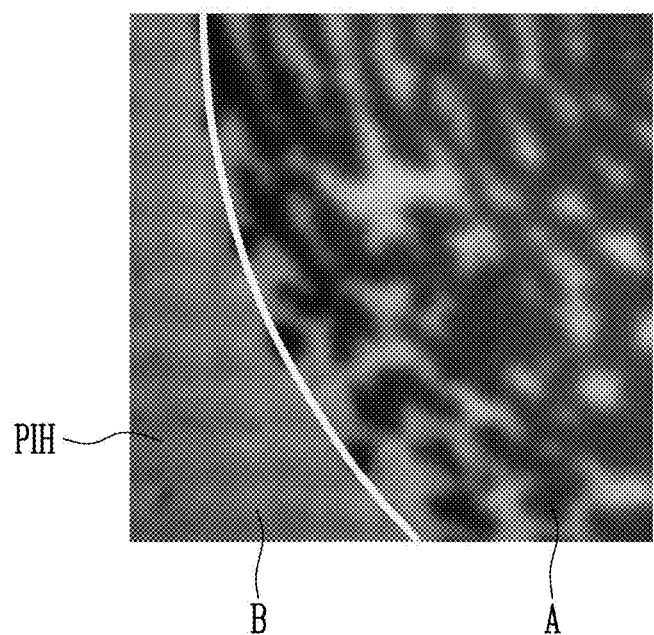
FIG. 12B is an image illustrating another exemplary biometric fingerprint image used in a similarity determination method carried out in the similarity determiner shown in FIG. 11.

FIG. 11 is a block diagram schematically illustrating an exemplary embodiment of the fingerprint detector shown in FIGS. 1A and 1B. FIG. 12A is an image illustrating an exemplary biometric fingerprint image used in a similarity determination method carried out in the similarity determiner shown in FIG. 11. FIG. 12B is an image illustrating another exemplary biometric fingerprint image used in a similarity determination method carried out in the similarity determiner shown in FIG. 11.

Referring to FIGS. 1A to 12B, the fingerprint detector FPDP may include an image receiver IRP, a database DBP, an image extractor IEP, an image processor IPP, a similarity determiner SDP, and a fingerprint authentication performing unit FPAP.

The fingerprint detector FPDP may be integrally formed with the light sensing array layer LSL as one module, but be a separate device connected to the light sensing array layer LSL through a specific communication interface. For example, the fingerprint detector FPDP may be a processor or other computing device (or a partial configuration therein) connected to the light sensing array layer LSL provided in a module form through a Universal Serial Bus (USB). Therefore, the light sensing array layer LSL may have a USB interface connected to the fingerprint detector FPDP.

The image receiver IRP may receive all images received from the light sensing array layer LSL at a predetermined frame rate, and transfer the images to the image extractor IEP. Also, the image receiver IRP may recognize a fingerprint image acquired from the light sensing array layer LSL when a fingerprint is in contact with the fingerprint contact surface SF1 of the display device DD among the received images, store the fingerprint image in a buffer, and then transfer the fingerprint image to the image extractor IEP. The image receiver IRP may check whether an image among the received images is a fingerprint image by sensing a change in specific element value (e.g., a gray level, a brightness level, a number of pixels of which values are changed, etc.), store the image in the buffer when the image is determined as the fingerprint image, and then transfer the image to the image extractor IEP.

The database DBP stores a registered fingerprint image. The database DBP may store feature point information analyzed with respect to the registered fingerprint image. Since feature points vary depending on persons, the database DBP may obtain a registered fingerprint image from a user, analyze positions and a number of feature points, form the analyzed information as database, and then store the database. The feature points may include an ending point through which a ridge in the registered fingerprint image passes, a bifurcation point at which two or more ridges meet each other.

The image extractor IEP may extract an image of a selected region from the fingerprint image transferred from the image receive IRP. The image extractor IEP may extract each of an image of a first region A for fingerprint authentication and an image of a second region B as a fingerprint peripheral region by using a brightness difference (or gray level difference) for each region due to a difference between reflected light in the fingerprint image transferred from the image receiver IRP.

In an example, the image extractor IEP may select, as a Region Of Interest (ROI), a first region A corresponding to a relatively bright region in the fingerprint image shown in FIG. 8 to extract only an image of the corresponding region. Alternatively, the image extractor IEP may select, as a Region Of Interest (ROI), a second region B corresponding to a relatively dark region in the fingerprint image shown in FIG. 8 to extract only an image of the corresponding region. In some exemplary embodiments, the image extractor IEP may extract an image of the first region A and an image of the second region B by using an edge tracing algorithm, an edge detection algorithm, a boundary flowing algorithm, etc., as is known in the art. The image extractor IEP may extract an image of the first region A for fingerprint authentication and an image of the second region B corresponding to the peripheral portion of the first region A from the fingerprint image transferred from the image receiver IRP by using various methods known in the art.

The image of the first region A and the image of the second region B, which are extracted from the image extractor IEP, may be transferred to the image processor IPP.

The image processor IPP may perform image-preprocessing on the image of the first region A and the image of the second region B, which are transferred from the image extractor IEP. The image-preprocessing may process the image of the first region A and the image of the second region B in a form in which required information can be easily found by removing noise included in the image of the first region A and the image of the second region B and reducing the amount of data. The image-preprocessing may include a smoothing process, a binarization process, a thinning process, and the like.

The image processor IPP may perform a smoothing process of increasing brightness distinguishment and removing noise so as to minimize influence of noise with respect to each of the image of the first region A and the image of the second region B. In an example, the smoothing process may perform smoothing using a histogram and then perform smoothing using a median filter for additionally removing fine noise. Also, the image processor IPP may perform a binarization process of changing the image of the first region A and the image of the second region B, from which the noise is removed through the smoothing process, to 0 (black) or 1 (white) and then performing a thinning process. The image processor IPP may synthesize the image of the first region A and the image of the second region B, on which the image-preprocessing is performed, and then transfer the synthesized image to the similarity determiner SDP.

The similarity determiner SDP may be in the form of one or more comparators that determine the degree of similarity of the first region A and the second region B through the image transferred from the image processor IPP.

As shown in FIG. 12A, when the luminance (or brightness) difference between an image of a first region A and an image of a second region B exists with respect to a boundary between the first region A and the second region B, and the image of the first region A and the image of the second region B have patterns similar or substantially equal to each other, the similarity determiner SDP may determine that the image of a first region A and the image of the second region B are images similar to each other. In an exemplary embodiment of the invention, when an image of a first region A and an image of a second region B have patterns similar or substantially equal to each other, this may mean a case where the image of the first region A and the image of the second region B include ridges and valleys of a fingerprint, which have continuity. Also, when the luminance (or brightness) difference between an image of a first region A and an image of a second region B exists, and the image of the first region A and the image of the second region B do not have patterns similar or substantially equal to each other, the similarity determiner SDP may determine the image of the first region A and the image of the second region B as images that are not similar to each other.

When it is determined that the image of the first region A and the image of the second region B are similar to each other (i.e., a luminance (or brightness) difference between the image of the first region A and the image of the second region B exists, and the image of the first region A and the image of the second region B include ridges and valleys of a fingerprint, which have continuity), the similarity determiner SDP may recognize the fingerprint in contact with the fingerprint contact surface SF1 as a biometric fingerprint, and transfer the result to the fingerprint authentication performing unit FPAP. The fingerprint authentication performing unit FPAP may perform fingerprint authentication by matching the image of the first region A to a registered fingerprint image transferred from the database DBP.

In addition, when it is determined that the image of the first region A and the image of the second region B are not similar to each other (i.e., a luminance (or brightness) difference between the image of the first region A and the image of the second region B exists, but the image of the first region A and the image of the second region B do not include the ridges and valleys of a fingerprint, which have continuity), the similarity determiner SDP may recognize the fingerprint in contact with the fingerprint contact surface SF1 as a forged fingerprint, and transfer the result to the fingerprint authentication performing unit FPAP. The fingerprint authentication performing unit FPAP may not perform fingerprint authentication, based on the result of the similarity determiner SDP.

In another embodiment, the similarity determiner SDP may determine the degree of similarity of the images by comparing the image transferred from the image processor IPP with a registered reference image. The registered reference image may be an image in a grid arrangement of pin holes PIH observed in a second region B of a forged fingerprint as shown in FIG. 12B. That is, in another embodiment, the similarity determiner SDP may determine whether the image transferred from the image processor IPP corresponds to a reference image including a grid arrangement of pin holes PIH, and transfer the result to the fingerprint authentication performing unit FPAP.

When the image transferred from the image processor IPP does not correspond to the reference image including the grid arrangement of the pin holes PIH, the similarity determiner SDP may recognize the fingerprint in contact with the fingerprint contact surface SF1 as a biometric fingerprint, and transfer the result to the fingerprint authentication performing unit FPAP. The fingerprint authentication performing unit FPAP may perform fingerprint authentication by matching the image of the first region A to a registered reference image transferred from the database DBP. In addition, when the image transferred from the image processor IPP corresponds to the reference image including the grid arrangement of the pin holes PIH, the similarity determiner SDP may recognize the fingerprint in contact with the fingerprint contact surface SF1 as a forged fingerprint, and transfer the result to the fingerprint authentication performing unit FPAP. The fingerprint authentication performing unit FPAP may not perform fingerprint authentication, based on the result of the similarity determiner SDP.

As described above, in accordance with the exemplary embodiment of the invention, the light sensing array layer LSL including the photo sensors PSR and the selective light transmitting layer LBL including the pin holes PIE constitute the fingerprint sensor FPS, so that the fingerprint sensor FPS can be implemented in a large area. When the large-area fingerprint sensor FPS is used, the fingerprint sensor FPS can acquire an image of the whole of a fingerprint of a user. Thus, the fingerprint sensor FPS can acquire not only an image of a first region A of the fingerprint in contact with the fingerprint contact surface SF1 but also an image of a second region B that is a peripheral portion of the first region A. The fingerprint sensor FPS determines a degree of similarity by analyzing only the image of the first region A and the image of the second region B, to determine whether the fingerprint in contact with the fingerprint contact surface SF1 is a biometric fingerprint or forged fingerprint.

Accordingly, display devices in accordance with exemplary embodiments of the invention can easily determine whether a fingerprint in contact with the fingerprint contact surface SF1 is a forged fingerprint, without having a separate bio sensor for determining whether the fingerprint is a biometric fingerprint. Further, display devices in accordance with exemplary embodiments of the invention can easily determine whether a fingerprint in contact with the fingerprint contact surface SF1 is a forged fingerprint, without having a sensor (e.g., a color sensor) for determining whether the fingerprint is a forged fingerprint by using color characteristics of light reflected from the fingerprint. Furthermore, display devices in accordance with the exemplary embodiment of the invention can reduce manufacturing cost generated compared to when a separate bio sensor and/or a separate color sensor are required.

Hereinafter, a fingerprint authentication method of the invention will be described, based on an operation of the fingerprint detector FPDP shown in FIG. 11, with reference to FIGS. 13 and 14.

FIG. 13 is a flowchart illustrating an exemplary fingerprint authentication method of the fingerprint detector shown in FIG. 11 according to principles of the invention.

Referring to FIGS. 1A to 13, the first step is to determine whether a fingerprint has been in contact with a fingerprint contact surface SF1 (S10).

When the contact is recognized as a contact for fingerprint recognition, light emitting elements LD (OLED) included in fingerprint pixels FPXL (PXL) corresponding to the fingerprint contact surface SF1 are turned on by driving the fingerprint pixels FPXL (PXL), so that light are emitted toward the fingerprint contact surface SF1. Subsequently, light reflected by the fingerprint in contact with the fingerprint contact surface SF1 can then pass through pin holes PIH and are received using photo sensors PSR of the light sensing array layer LSL. The photo sensors acquire a fingerprint image by converting the received light into electrical signals (S20).

The acquired fingerprint image is transferred to the image extractor IEP through the image receiver IRP. The image extractor IEP extracts an image of one region (first region A) of the fingerprint in contact with the fingerprint contact surface SF1 and an image of a peripheral portion (second region B) of the one region of the fingerprint (S30).

The images extracted from the image extractor IEP are transferred to the image processor IPP. The image processor IPP performs image-preprocessing on the extracted images, and synthesizes the images (S40).

The images on which the image-preprocessing has been performed are transferred to the similarity determiner SDP, and the similarity determiner SDP determines a similarity of the image (S50). When the similarity determiner SDP determines that the image of the first region A and the image of the second region B are similar to each other with respect to the synthesized image, the fingerprint in contact with the fingerprint contact surface SF1 is determined as a biometric fingerprint (S60). Accordingly, the fingerprint authentication performing unit FPAP performs a fingerprint authentication process (S70). In addition, when the similarity determiner SDP determines that the image of the first region A and the image of the second region B are not similar to each other with respect to the synthesized image, the fingerprint in contact with the fingerprint contact surface SF1 is determined as a forged fingerprint, and therefore, the fingerprint authentication process is not performed (S80).

FIG. 14 is a flowchart illustrating another exemplary fingerprint authentication method of the fingerprint detector shown in FIG. 11 according to principles of the invention. Steps S10 to S40 shown in FIG. 14 are identical to the steps S10 to S40 shown in FIG. 13, and therefore, their descriptions will be omitted to avoid redundancy.

Referring to FIGS. 1A to 11, 12B, and 14, images on which the image-preprocessing has been performed are transferred to the similarity determiner SDP, and it is determined whether an image corresponds to a reference image (S150). When the similarity determiner SDP determines whether the image corresponding to the second region B among the images corresponds to the reference image, the fingerprint in contact with the fingerprint contact surface SF1 is determined as a forged fingerprint (S160). In an exemplary embodiment of the invention, the reference image may be an image including a grid arrangement of pin holes PIH.

In addition, when the similarity determiner SDP determines whether the image corresponding to the second region B among the images does not correspond to the reference image, the fingerprint in contact with the fingerprint contact surface SF1 is determined as a biometric fingerprint (S170). Accordingly, the fingerprint authentication performing unit FPAP performs a fingerprint authentication process (S180).

Exemplary implementations of the invention provide a display device including a fingerprint sensor and a fingerprint authentication method to simultaneously acquire a first image for fingerprint authentication and a peripheral portion of a fingerprint in contact with a fingerprint contact surface (e.g., a region in which the fingerprint is not in contact with the fingerprint contact surface) by sensing light reflected by the fingerprint and determine similarity of the first and second images, so that it can be easily determined whether the fingerprint is a forged fingerprint.

Although certain exemplary embodiments and implementations have been described herein, other embodiments and modifications will be apparent from this description. Accordingly, the inventive concepts are not limited to such embodiments, but rather to the broader scope of the appended claims and various obvious modifications and equivalent arrangements as would be apparent to a person of ordinary skill in the art.

What is claimed is:

1. A display device comprising:
    a fingerprint sensor including a first layer having at least one photo sensor to generate a fingerprint image corresponding to reflected light from a fingerprint contact surface, light emitting elements to transmit light reflected by a fingerprint, and a second layer including pin holes to allow reflected light to be incident upon the at least one photo sensor; and
    a fingerprint detector to receive the fingerprint image from the fingerprint sensor, to extract a first image corresponding to a first region of the fingerprint and a second image corresponding to a second region of the fingerprint, to compare the first and second images to determine similarity, and to perform fingerprint authentication, based on similarity determination,
    wherein the first region of the fingerprint is in contact with the fingerprint contact surface and the second region of the fingerprint is not in contact with the fingerprint contact surface.

2. The display device of claim 1, wherein the fingerprint detector comprises:
    a fingerprint image extractor to receive the fingerprint image from the first layer to extract the first image and the second image;
    an image processor to perform preprocessing on the extracted first and second images;
    a comparator to determine similarity by comparing the preprocessed first image and the preprocessed second image; and
    an authentication unit to authenticate the fingerprint, based on the determination of the comparator.

3. The display device of claim 2, wherein the comparator is configured to determine whether the fingerprint is a biometric fingerprint, by comparing a luminance of the preprocessed first image and a luminance of the preprocessed second image and whether the preprocessed first and second images have similar patterns.

4. The display device of claim 3, wherein the comparator is configured to determine the similarity of patterns of the preprocessed first and second images by analyzing continuity of at least one of valleys and ridges of the preprocessed second image with at least one of valleys and ridges of the preprocessed first image.

5. The display device of claim 4, wherein, when the luminance of the preprocessed first image and the luminance of the preprocessed second image are different from each other, and the preprocessed first and second images have the similar patterns, the comparator is configured to determine that the fingerprint is a biometric fingerprint.

6. The display device of claim 4, wherein, when the luminance of the preprocessed first image and the luminance of the preprocessed second image are different, and the preprocessed first and second images do not have the similar patterns, the comparator is configured to determine that the fingerprint is forged.

7. The display device of claim 6, wherein the fingerprint image extractor is configured to extract the first and second image by differentiating an amount of light reflected in the first region of the fingerprint and an amount of light reflected in the second region of the fingerprint.

8. The display device of claim 1, wherein the first layer comprises a light sensing array layer and the second layer comprises a selective light transmitting layer having a light blocking pattern located between pin holes, and wherein the pin holes are configured to focus light emitted that is from the respective light emitting elements and then reflected from the fingerprint.

9. The display device of claim 8, wherein the pin holes comprise an array.

10. The display device of claim 9, wherein the fingerprint detector comprises:
a fingerprint image extractor to receive the fingerprint image from the light sensing array layer to extract the first image and the second image;
an image processor to preprocess the extracted first and second images, and to synthesize the first and second images;
a comparator to determine whether the synthesized second image from the image processor includes the array; and
an authentication unit to authenticate the fingerprint based on the determination of the comparator.

11. The display device of claim 10, wherein when the second image includes the array, the comparator is configured to determine that the fingerprint image is forged.

12. The display device of claim 11, wherein, when the second image does not include the array, the comparator is configured to determine that the fingerprint image is a biometric fingerprint.

13. The display device of claim 1, wherein the second region is located at the periphery of the first region.

14. The display device of claim 12, wherein the array comprises a grid arrangement.

15. The display device of claim 4, wherein the comparator comprises a similarity determiner configured to determine similar patterns by analyzing continuity of valleys and ridges of the preprocessed second image with valleys and ridges of the preprocessed first image.

16. A method of authenticating a fingerprint for a display device having a fingerprint sensor, the method comprising the steps of:
receiving a fingerprint image corresponding to a fingerprint of a user in contact with a fingerprint contact surface by sensing light reflected by the fingerprint;
extracting from the fingerprint image a first image corresponding to a first region of the fingerprint in contact with the fingerprint contact surface and a second image corresponding to a second region of the fingerprint located at a periphery of the first region of the fingerprint;
comparing the extracted first and second images; and
authenticating the fingerprint based on the comparison of the extracted first and second images.

17. The method of claim 16, further comprising the step of performing image preprocessing on the extracted first and second images.

18. The method of claim 17, further comprising the step of determining that the fingerprint is a biometric fingerprint by using a luminance of the preprocessed first image and a luminance of the preprocessed second image to determine that the preprocessed first and second images have similar patterns.

19. The method of claim 18, wherein the first and second images have similar patterns when the preprocessed first image and the preprocessed second image have valleys and ridges in continuity with each other.

20. The method of claim 19, further comprising the step of determining that the fingerprint is a biometric fingerprint when the luminance of the first and second images are different from each other, and the first and second images have similar patterns.

21. The method of claim 20, further comprising the step of determining that the fingerprint is forged when the luminance of the first and second images are different from each other, and the first and second images do not have similar patterns.

22. The method of claim 16, wherein the fingerprint sensor comprises a first layer including at least one photo sensor to sense light reflected by the fingerprint and a second layer including pin holes arranged in an array to transmit incident light upon the photo sensor,
and further comprises the step of determining that the fingerprint is a forged fingerprint, when the second image includes the array.

23. The method of claim 22, further comprising the step of determining that the fingerprint is a biometric fingerprint, when the preprocessed second image does not include the array.

24. A fingerprint detector in a display device to differentiate a biometric fingerprint from a forged fingerprint, the fingerprint detector comprising:
a fingerprint image extractor to receive a fingerprint image from a light sensing array layer to extract a first image corresponding to a first region of the fingerprint image of a fingerprint in contact with a fingerprint contact surface, and a second image corresponding to a second region of the fingerprint image not in contact with the fingerprint contact surface;
an image processor to perform preprocessing on the extracted first and second images;
a comparator to compare the preprocessed first image and the preprocessed second image; and
an authentication unit to authenticate the fingerprint based on a determination of the comparator.

25. The fingerprint detector of claim 24, wherein the second region of the fingerprint image is located at a periphery of the fingerprint.

* * * * *